July 23, 1963 J. G. V. ISABEAU 3,098,936

SIGNAL TRANSLATORS UTILIZING INPUT SIGNAL LEVEL WHICH SELECTIVELY SATURATES TRANSISTOR BASE-COLLECTOR JUNCTION

Filed July 14, 1958 6 Sheets-Sheet 1

INVENTOR
Jean G V. Isabeau
BY Francis W. Crotty
ATTORNEY

INVENTOR
Jean G.V. Isabeau
BY Francis W. Crotty
ATTORNEY

INVENTOR
Jean G. V. Isabeau
BY Francis W. Crotty
ATTORNEY

INVENTOR
Jean G. V. Isabeau
BY Francis W. Crotty
ATTORNEY

July 23, 1963 J. G. V. ISABEAU 3,098,936

SIGNAL TRANSLATORS UTILIZING INPUT SIGNAL LEVEL WHICH SELECTIVELY SATURATES TRANSISTOR BASE-COLLECTOR JUNCTION

Filed July 14, 1958 6 Sheets-Sheet 5

INVENTOR

Jean G. V. Isabeau

BY Francis W. Crotty

ATTORNEY

INVENTOR
Jean G.V. Isabeau
BY Francis W. Crotty
ATTORNEY

1

3,098,936
SIGNAL TRANSLATORS UTILIZING INPUT SIGNAL LEVEL WHICH SELECTIVELY SATURATES TRANSISTOR BASE-COLLECTOR JUNCTION

Jean G. V. Isabeau, Lombard, Ill., assignor to Zenith Radio Corporation, a corporation of Delaware Filed July 14, 1958, Ser. No. 748,272
32 Claims. (Cl. 307—88.5)

This invention pertains in general to a novel signal-translating apparatus, and more particularly to such apparatus employing a transistor or semi-conductor device and having a signal-transfer characteristic exhibiting a specified shape.

Advantage is taken of certain properties of a transistor in order to provide a signal or voltage transfer characteristic that contains two portions of opposite polarity slope. Such a transfer characteristic may be employed in many different environments to be discussed to achieve extremely beneficial results.

It is an object of the invention, therefore, to provide a novel signal-translating apparatus employing a transistor or semi-conductor device.

It is another object of the invention to provide a novel signal-translating apparatus exhibiting a signal-transfer characteristic having two portions of opposite slope.

It is still another object to provide a novel secrecy communication encoding arrangement.

It is an additional object to provide a novel noise cancellation circuit for a television receiver.

It is a further object to provide a new and improved synchronizing signal separator for incorporation in a television receiver.

Certain embodiments of the invention to be considered utilize the effect of a transistor referred to as "charge storage." To appreciate the concept of charge storage, it must be recognized that a transistor may be operated in a condition of voltage saturation in which, for example, the collector electrode is effectively short circuited to the base electrode. More precisely, when the collector current has attained a maximum value determined by the external circuit and yet is not sufficient to carry or dissipate all of the injected minority carriers, a saturation condition prevails in which there is a surplusage or charge of minority carriers at the base-collector junction, and generally throughout the thickness of the base. In order to translate a signal variation to the collector circuit under such conditions, it is necessary that the charge of minority carriers be swept away by recombination, absorption to the collector or base electrodes or otherwise and the time required for this to be accomplished is referred to as the charge storage time. That characteristic of the transistor varies with the specific composition of the semi-conductor and its impurity components as well as the operating or biasing potentials applied to its electrodes. Transistors that are so constructed and biased are termed "slow" transistors as distinguished from the "fast" variety in which there is negligible storage. Since the effect of storage may be controlled and since it is of finite duration, it represents a property that may advantageously be employed in discriminating or separating applied pulses on the basis of their pulse durations.

A signal-translating apparatus, constructed in accordance with one aspect of the invention, comprises a junction-type transistor having a base, an emitter and a collector and having a signal-transfer characteristic dependent upon applied operating potentials and load impedance associated with the transistor. A load impedance is coupled to the emitter, and a load impedance is coupled to the collector. There are means coupled in series with the emitter and collector loads for

2 applying unidirectional operating potentials to the transistor, the apparatus having an input voltage-output voltage transfer characteristic from the base to the collector, relative to a plane of reference potential, having two portions of opposite slope and a common interconnecting portion. Finally, there are means including a voltage source for applying between the base and the plane of reference potential an input signal having a reference amplitude level established at an operating point on the transfer characteristic such that the envelope of the input signal embraces at least a part of each of two of the portions of the transfer characteristic whereby the phase of an output signal developed across the collector load is determined by the sense of amplitude excursions of the input signal relative to the common interconnecting portion.

The features of this invention which are believed to be new are set forth with particularity in the appended claims. The invention, together with further objects and advantages thereof, may best be understood, however, by reference to the following description in conjunction with the accompanying drawings, in which:

Figure 18:
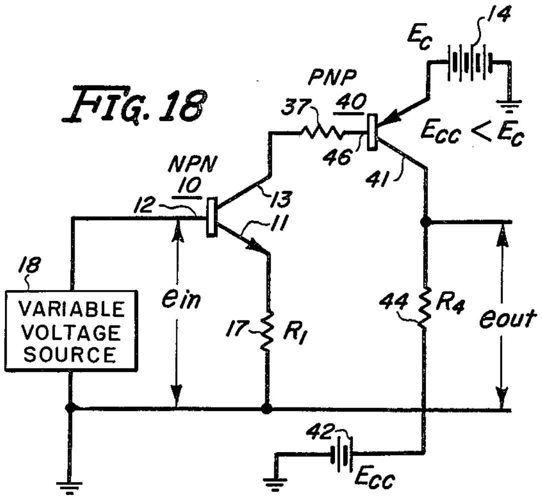
FIGURE 18 illustrates a signal-translating circuit constructed in accordance with a still further embodiment of the invention.
Figures 20, 25:
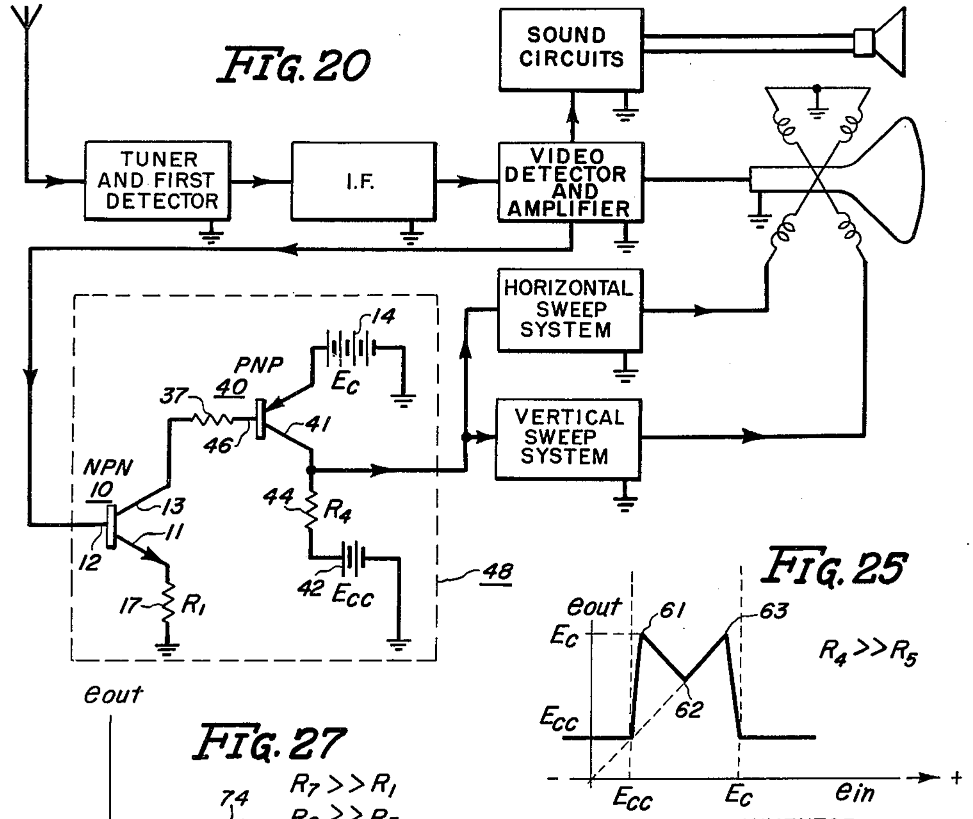
Figure 27:
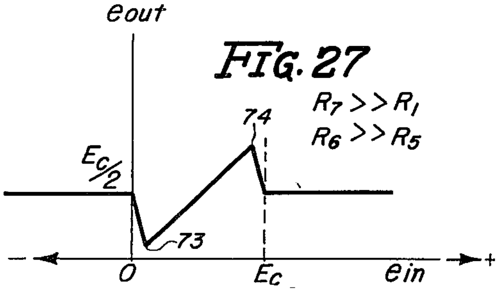
Figures 21, 22, 23, 24, 26:
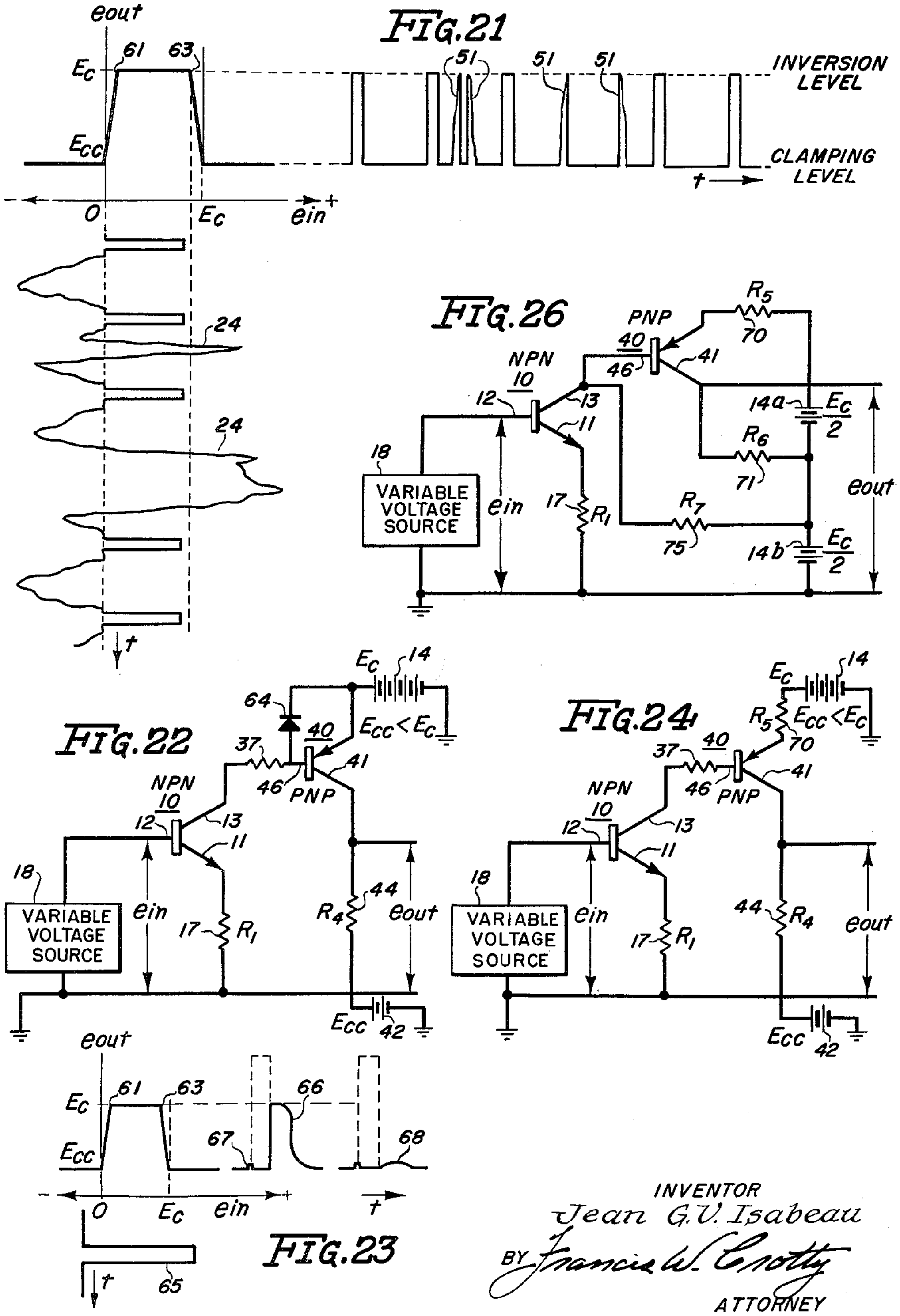

FIGURE 20 indicates the manner in which the circuit of FIGURE 18 may be incorporated in a conventional television receiver;

FIGURE 21 illustrates the input-output voltage transfer characteristic of the circuit of FIGURE 20, plus wave form representations of certain signals appearing in the receiver of FIGURE 20;

FIGURE 22 illustrates a modification of the circuit of FIGURE 18 constructed according to an additional embodiment of the invention;

FIGURE 23 depicts the transfer characteristic realized by the circuit of FIGURE 22;

FIGURE 24 shows another variation of the circuit of FIGURE 18 representing a still further aspect of the invention;

FIGURE 25 illustrates the input-output transfer characteristic obtained by the circuit of FIGURE 24;

FIGURE 26 is another signal-translating circuit illustrating one more embodiment of the invention; and, FIGURE 27 represents the voltage transfer characteristic of the circuit of FIGURE 26.

Figure 1:
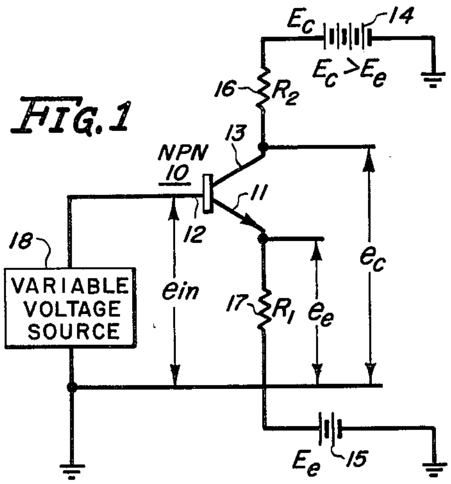
FIGURE 1 illustrates a signal-translating circuit, including a transistor, constructed in accordance with one embodiment of the invention.

Turning now specifically to the circuit of FIGURE 1, a conventional three-terminal, NPN type "fast" transistor 10, having a semi-conductor body with two conductivity zones of N type and another conductivity zone of P type and capable of high frequency operation, has its collector electrode 13 connected to the positive terminal of a unidirectional potential source 14 of magnitude $E_c$ through a collector load or impedance in the form of a resistor 16 having a resistance value of $R_2$. The negative terminal of collector source 14 is connected to a plane of common or reference potential, here shown as ground. Emitter electrode 11 of transistor 10 is connected to the positive terminal of a second unidirectional potential source 15 of magnitude $E_e$ through an emitter load or impedance in the form of a resistor 17 having a resistance value of $R_1$. The negative terminal of emitter source 15 is returned to ground. A source 18 of a variable or varying input signal, connected between the base electrode 12 of the transistor and ground, applies an input signal voltage between base electrode 12 and ground which may be varied over a wide amplitude range. Since the terminal of load resistor 17 which is not connected to emitter 11 is at ground for A.C., the input signal from source 18 is effectively applied between base 12 and that terminal of resistor 17.

In order to simplify the explanation of the base-to-emitter and base-to-collector voltage transfer characteristics for the cirrcuit of FIGURE 1, collector load resistor 16 and emitter load resistor 17 have been chosen of equal magnitude. In other words, $R_1$ equals $R_2$. The collector and emitter potential sources may be of any reasonable magnitude so long as the voltage of the terminal of the emitter source, which is not grounded, is more negative, by a significant amount, than the ungrounded terminal of the collector source. The absolute magnitudes of both sources and the maximum allowable difference therebetween will, of course, be determined by the voltage ratings of the particular transistor type employed. The unidirectional supply potential for the transistor is the algebraic difference between $E_c$ and $E_e$. In the case of FIGURE 1, the supply voltage is $E_c - E_e$.

In view of the fact that transistor 10 is of the NPN type, the variation of voltage source 18 may be limited to a range which extends from zero or ground potential or, for that matter, from some negative potential, to a positive potential which exceeds that of collector source 14 by a substantial amount.

Figure 2:
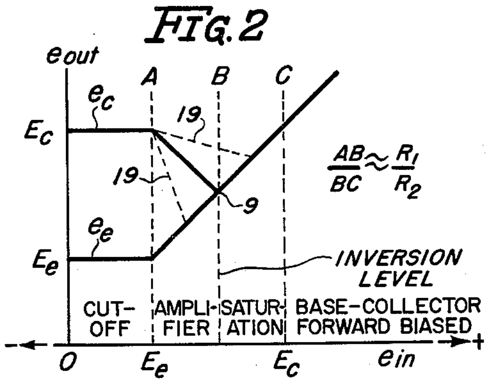
FIGURE 2 is a graphical representation of the collector and emitter voltage transfer characteristics of the circuit of FIGURE 1.

The graphical representations of FIGURE 2 illustrate the potentials which appear between collector electrode 13 and ground $e_c$, and also between emitter electrode 11 and ground, $e_e$, as the potential $e_{in}$ applied between the base and ground is varied over a total range extending from zero volt to a positive potential which exceeds that of the collector source, namely $E_c$. In other words, the line labeled $e_c$ represents the voltage transfer characteristic from base electrode 12 to collector electrode 13 with ground as a reference and line $e_e$ defines the voltage transfer characteristic from the base electrode to emitter electrode 11, also with ground as a reference. If the terminal of emitter load 17 connected to battery 15 is considered the reference, the shape of the transfer characteristic is the same but assumes a different position with respect to both the vertical and horizontal axis in FIGURE 2. Specifically, the sloping portions would be moved both down and to the left so that the point defined by the intersection of the $E_e$ level on the abscissa and the $E_e$ level on the ordinate becomes the zero origin for both the vertical and horizontal axis. This follows since the lower terminal of resistor 17 would effectively be at ground potential.

The total range of input signal covered by the voltage transfer characteristics of FIGURE 2 has been broken down or divided into four smaller ranges designated O—A, A—B, B—C, and beyond C, level A deisgnating the point at which the input voltage $e_{in}$ equals the emitter source potential $E_e$ and level C indicating the point at which the input voltage equals the collector potential $E_c$. The total range greatly exceeds the value of the supply potential $E_c - E_e$. As shown, the emitter and collector potentials $e_e$ and $e_c$, respectively, remain at the emitter and collector source potentials $E_e$ and $E_c$, respectively, so long as the signal potential $e_{in}$ applied between base electrode 12 and ground does not exceed the potential of the emitter source, namely $E_e$. This condition persists since no current flows in the collector or emitter circuits until base current commences to flow.

A slight increase in potential $e_{in}$ over potential level $E_e$ results in forward biasing the base-emitter junction of transistor 10 which, in turn, results in current flow through a path comprising the base-emitter junction, emitter load 17, emitter source 15 and signal source 18. This current flows in the direction from emitter 11 to source 15. This obtains since transistor 10, being of the NPN type, requires a voltage on its base that is positive with respect to that on its emitter to initiate conduction. The translation of current through the base-emitter junction in turn initiates conventional transistor amplifier operation and thus results in an amplified current in the collector-emitter circuit which comprises the collector-emitter conduction path, emitter load 17, emitter source 15, collector source 14 and collector load 16. This current, flowing in the direction from source 14 to collector 13, results in an increase in the potential $e_e$ appearing between emitter electrode 11 and ground because of the voltage drop across resistor 17 which adds to the potential $E_e$ and a decrease in the potential $e_c$ between collector electrode 13 and ground due to the potential drop across collector load 16 which is subtracted from potential $E_c$.

Accordingly, during the range A—B of FIGURE 2 the circuit of FIGURE 1 functions as a conventional amplifier with a substantial amount of degenerative feed back caused by the presence of unbypassed emitter load 17.

As the input potential $e_{in}$ is increased through the range A—B, emitter potential $e_e$ and collector potential $e_c$ continue to change and approach one another at a constant rate. At input voltage level B, called the "inversion level," the collector-to-emitter potential difference has dropped to substantially zero, causing transistor 10 to saturate. A further increase in the input potential $e_{in}$ causes the now substantially common collector and emitter potentials to rise at substantially the same rate, and consequently the same slope, as the rise which occurred in the emitter potential $e_e$ during range A—B. In other words, during range B—C transistor 10 is essentially short circuited and thus the collector voltage follows the emitter voltage. As the input signal is increased beyond the level B, the collector and emitter have the same potential which increases with input signal strength and at the same rate at which the emitter potential increased as the input signal was raised over range A—B. The increasing emitter voltage $e_e$, of course, results from increased current flow through resistor 17 due to the increased input voltage. The rise in collector voltage $e_c$ results in linearly decreasing collector current within the range B—C. This follows since an increasing collector voltage results in a decreasing voltage drop or potential difference across collector load 16, which in turn gives rise to decreasing collector current. It should be realized that over range B—C of input signal an increasingly higher percentage of the current flowing through emitter load 17 flows through voltage source 18.

At input voltage level C, the input potential $e_{in}$ has reached a magnitude equal to a potential $E_c$ of collector source 14, and there then being no potential difference across collector load 16, the collector current is reduced to zero. A further increase in the input voltage effects forward biasing of the base-collector junction of transistor 10 which results in a reversal in the direction of collector current, namely current now begins to flow toward collector source 14. Transistor 10 serves essentially as a double diode under such operating conditions and both the collector and emitter currents continue to increase linearly with input signal to a value or magnitude limited only by the capabilities of the driving source and the current-handling capacity of the particular transistor employed.

Thus, the collector voltage transfer characteristic of FIGURE 2 has two portions (namely, the portion within range A—B and that beyond level B) of opposite polarity and finite slope joined at a common vertex or interconnecting portion, designated 9. Additionally, the emitter voltage transfer characteristic is of constant slope and merges into the collector voltage transfer characteristic at input signal level B. Vertex or interconnecting portion 9 defines the point at which the voltages of the collector and emitter electrodes become equal. The slope of the collector voltage transfer characteristic $e_c$ within the range A—B represents the rate at which collector current increases from zero and the slope in range B—C represents the rate at which the collector current decreases back to zero, vertex 9 indicating the point at which the collector current has its maximum value. The slope beyond signal level C defines the rate of collector current increase in the opposite direction, that is, in a sense opposite to the direction of initial current flow in the collector circuit.

Inversion level B defines the input voltage level at which a phase inversion is made. In other words, a varying input voltage less than level B in range A—B appears at collector 13 in phase opposition (as in a typical class A vacuum tube type amplifier), whereas a varying input voltage positive with respect to level B is translated to collector 13 in like phase.

In the embodiment of FIGURE 1 as described, both an emitter source and a collector source are employed and the emitter and collector load resistors have the same value. This, of course, is not a restriction on the circuit. The magnitude of emitter load resistor 17 is determined primarily by the power handling capabilities of input signal source 18 and the transistor. Increasing the magnitude of emitter load 17 reduces the level of base current for a given input voltage and correspondingly reduces the power which must be supplied from the input signal source. As mentioned before, emitter source 15 may have any suitable value of potential including negative values such that it is less in the algebraic sense than the potential of collector source 14 by a significant amount. The emitter source, may, in fact, be completely eliminated by returning emitter load 17 directly to ground.

Variations in the magnitude of emitter potential source 15, with a constant potential for the collector source, effectively lengthens or shortens the overall range A—C by moving level A laterally or horizontally with respect to the vertical axis of zero volt. Specifically, decreasing the emitter potential (making it less positive) lengthens range A—C and, of course, increasing the potential decreases range A—C. Variation in the magnitudes of both potential sources in the same sense and by the same amount has the effect of shifting the entire characteristic diagonally toward or away from the zero origin. For example, in response to a like decrease in both $E_e$ and $E_c$ the sloping portions within range A—C move equal distances both to the left and down. The supply potential defines a predetermined voltage range and since there is an emitter source in FIGURE 1 this potential range is represented between levels A—C in FIGURE 2.

Variations in the electrical size of collector load 16 shift the position of level B and vertex 9 relative to or within range A—C thereby changing the slope of the collector voltage transfer characteristic over range A—B. Increasing the collector load increases the rate of change and accordingly the slope of the collector voltage characteristic within range A—B, causing transistor 10 to reach saturation at a lower input voltage. The relationship existing between ranges A—B, B—C and the electrical size of the collector and emitter loads may be expressed approximately by the following ratio:

$$\frac{A-B}{B-C} \approx \frac{R_1}{R_2}$$

The vertex of the two portions of opposite polarity slope of the collector voltage transfer characteristic is thus determined by the ratio of the impedance or resistance of the emitter and collector loads. The effect of variations in the size of collector load 16 is shown by the dashed construction lines 19 in FIGURE 2. Of course, when the transistor is saturated and the collector is shorted to, and therefore follows the base, the slope of the transfer characteristic is substantially unity since the output signal equals the input signal.

The circuit of FIGURE 1 has been constructed and operated, and favorable results have been obtained, by utilizing the following circuit parameters:

| | | |
|---|---|---|
| Source 14 | volts | 1.5 |
| Resistor 16 | ohms | 15K |
| Transistor 10 | | 2N94A |
| Resistor 17 | ohms | 1500 |
| Source 15 | | Zero |

Without further modification the circuit of FIGURE 1 may be readily incorporated in a secrecy communication system, such as a subscription television system. There it is usually desirable to transmit the accompanying audio information in a manner which precludes accurate or intelligible reproduction by unauthorized receivers. In one sound coding system, which is described in detail in copending application Serial No. 366,727, filed July 8, 1953, and issued September 16, 1958, as Patent 2,852,598, in the name of Erwin M. Roschke, and assigned to the present assignee, the audio information is coded at the transmitter by alternately transmitting two oppositely phased audio signals. The phase inversion is carried out by means of a rectangularly shaped control signal that is phase modulated from time to time in accordance with a predetermined coding schedule, preferably a schedule having a random characteristic.

Figures 3, 4:
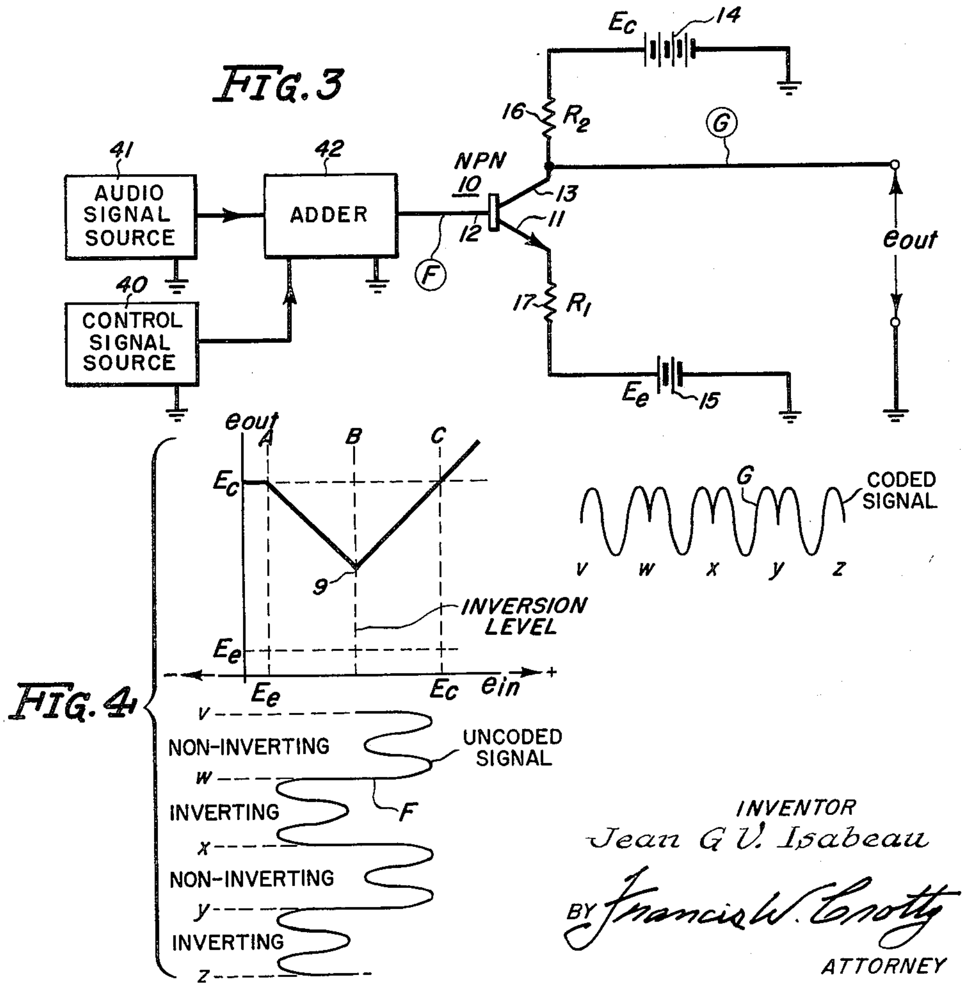
FIGURE 3 illustrates the manner in which the circuit of FIGURE 1 may be incorporated in a secrecy communication system, specifically a subscription television system.
FIGURE 4 depicts the collector voltage transfer characteristic of the system of FIGURE 3 along with graphical representations of certain signal wave forms appearing at different points in the system of FIGURE 3.

The circuit of FIGURE 1 readily lends itself to such coding because of the discrete ranges of opposed-polarity slope which occur in the base-to-collector voltage transfer characteristic within discrete levels of input voltage. As shown in FIGURE 3, the base of the transistor may be driven with a composite or combination signal comprising a rectangularly shaped selecting or control signal, having its amplitude variations representing a predetermined code schedule, similar to that developed in the aforementioned Roschke application, to which has been added an intelligence signal representing the desired uncoded audio information. It will be made apparent that the concept illustrated by the circuit in FIGURE 3 may readily be employed to effect decoding as well as coding.

The control or selecting signal is developed in a source 40 which may take the form of a corresponding source shown in detail in the aforementioned Roschke application. Briefly, source 40 may include a count-down multivibrator that is periodically actuated at a certain frequency, for example, at the horizontal scanning rate, but is reset at random times occurring at a considerably slower rate. The intelligence or audio signal is produced in a source 41 and the outputs of sources 40 and 41 are added or mixed in any well known manner in an adder 42 to provide an input signal for transistor 10 having the general wave form represented by wave form F in FIGURE 4. For convenience, this signal is divided into time segments or intervals *v—w*, *w—x*, *x—y* and *y—z*.

By adjusting the base bias of transistor 10 and the amplitude of the combination control-intelligence signal of curve F developed in adder 42, the audio signal occurring during intervals or time segments *v—w* and *x—y* may be confined to the portion of the collector voltage transfer characteristic within range B—C in FIGURE 4, while that which occurs during time segments *w—x* and *y—z* is confined within range A—B. The A.C. axis of the varying input voltage of curve F is thus effectively centered on common vertex 9 of the two opposed polarity slopes. In this way, the intelligence or audio signal is applied between base 12 and ground such that certain intervals of the intelligence signal (namely, intervals *v—w* and *x—y*) fall completely within the portion of the transfer characteristic having a slope of one polarity, whereas other intervals (*w—x* and *y—z*) of the intelligence signal fall completely within the portion of the transfer characteristic having the opposite polarity slope.

As a result of the difference in the slope of the collector characteristic in range A—B as compared to that in range B—C, the audio or intelligence signal appearing on collector 13 is coded since it undergoes a phase reversal during the half cycles of the rectangularly shaped coding signal component confined to range A—B, as shown by wave form G in FIGURE 4. Accordingly, the output voltage shown in curve G is in phase with respect to the intelligence or audio signal during some intervals but is in phase opposition during other intervals. In other words, during intervals *v—w* and *x—y* the system is effectively established in one operating mode in which applied voltages are translated in like phase, and during intervening intervals *w—x* and *y—z* the system is in another mode wherein applied voltages are translated in phase opposition or with a phase reversal. This, of course, achieves effective coding or scrambling since conventional receivers, not adapted to effect complementary phase inversions of the received coded audio signal at the correct instants produce unintelligible, thoroughly distorted sound.

Identically the same circuit as that shown in FIGURE 3 is useful in the receiving apparatus for decoding the received coded audio signal and converting it back to its original uncoded form. This is accomplished by providing a selecting or control signal at the receiver of substantially the same frequency and phase as that used for coding initially at the transmitter.

By applying a composite or combination signal consisting of the rectangularly shaped decoding or control signal and the coded audio to the base of transistor 10 in a manner already described, an additional phase reversal is introduced into appropriate portions of the coded audio, giving rise to an output signal at the collector which is substantially identical to the original audio signal prior to coding.

The following circuit parameters were employed in a circuit constructed and operated in accordance with FIGURE 3:

| | | |
|---|---|---|
| Source 14 | volts | 11 |
| Source 15 | do | 11 |
| Resistor 16 | ohms | 33K |
| Resistor 17 | do | 33K |
| Transistor 10 | | 2N94A |

Since the same apparatus is used in the receiver to achieve decoding as is utilized in the transmitter to accomplish coding, it is appropriate to employ the term "encoding" in its generic sense to encompass either coding at the transmitter or decoding at the receiver. Thus, transistor 10 and its associated circuitry in FIGURE 3 may be termed an encoding device and the control signal developed in source 40 may be called an encoding signal. Source 41 provides the original uncoded audio signal at the transmitter, whereas source 41 provides the coded audio signal (curve G) when the circuitry of FIGURE 3 is incorporated in a receiver.

Figure 5:
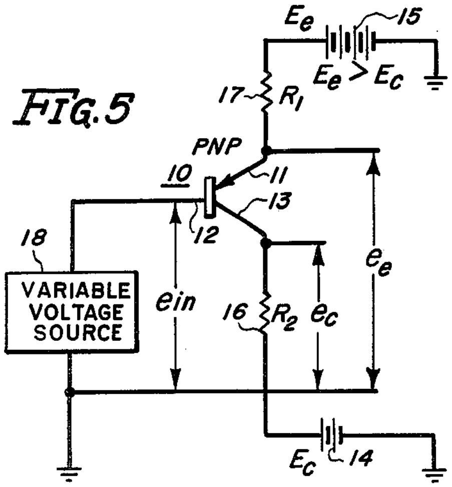
FIGURE 5 shows a signal-translating circuit, also including a transistor, constructed in accordance with another embodiment of the invention.

Another embodiment of the present invention, which has proven to be useful in certain television applications, is shown in FIGURE 5. It will be noted that this circuit is similar to that of FIGURE 1 with the exception that transistor 10 has been replaced by one of opposite gender or conductivity type, namely PNP. The collector and emitter loads 16 and 17, respectively, serve the same function as previously described and are returned to collector and emitter sources 14 and 15, respectively. Once again the varying input voltage source 18 is connected to the base of transistor 10 and provides a means for varying the base voltage in a continuous manner over a wide range extending from a relatively high negative potential to a similarly high positive potential. The magnitude $E_e$ of emitter potential source 15 has been altered such that it now exceeds the potential $E_c$ of collector source 14 by a significant amount. The supply voltage is therefore $E_e—E_c$ in the case of FIGURE 5.

Figure 6:
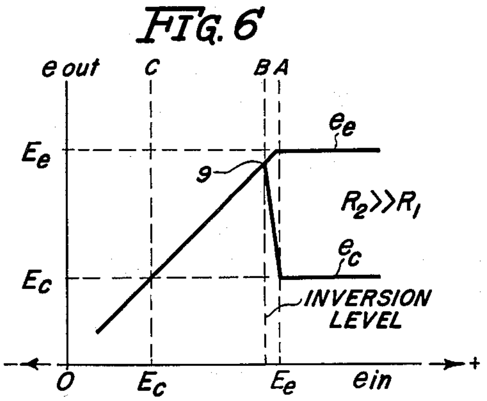
FIGURE 6 represents the collector and emitter voltage transfer characteristics of the circuit of FIGURE 5.

The voltage transfer characteristics of this circuit from the base to the collector and from the base to the emitter with ground as a reference are illustrated diagrammatically in FIGURE 6. For convenience of explanation, it is assumed initially that the voltage $e_{in}$ applied to base electrode 12 by signal source 18 exceeds the magnitude $E_e$ of emitter source 15. Reference to FIGURE 6 shows that the emitter and collector voltages $e_e$ and $e_c$, respectively, are at the emitter and collector source potentials $E_e$ and $E_c$, respectively, under this condition. As before, this is the result of the reverse or back bias on both the base-emitter and base-collector junctions of transistor 10 which precludes current flow in the emitter or collector circuits. It should be realized that in the case of a PNP type transistor, as is incorporated in the circuit of FIGURE 5, the potential on the base must be negative with respect to that on the emitter before current flow is initiated.

If the input voltage $e_{in}$ applied to the base electrode 12 is reduced to a magnitude slightly below $E_e$ of emitter potential source 15, the base-emitter junction becomes forward biased and current commences to flow in emitter load 17 and collector load 16 in the direction toward emitter 11 and toward source 14 under the influence of the net potential difference existing between emitter source 15 and collector source 14. The major component of this current flows from emitter source 15 to collector source 14 through the emitter-collector conduction path of transistor 10, thereby causing the voltages on collector 13 and emitter 11 to rise and fall respectively. The voltage change is shown in range A—B of FIGURE 6. If the resistance $R_2$ of collector load 16 is made substantially greater than the resistance $R_1$ of emitter load 17, range A—B will be relatively narrow (compared to range B—C), since the collector voltage will rise rapidly in response to a small reduction in the input voltage.

At input voltage level B, the inversion level, the collector and emitter voltages, $e_c$ and $e_e$, respectively, are substantially equal and accordingly, the operation of transistor 10 passes from the amplifier mode to the saturation or short circuit mode. During the relatively narrow range A—B the circuit of FIGURE 5 operates as a conventional amplifier with a certain amount of degenerative feedback as a result of the presence of unbypassed emitter load 17. A further reduction in the input potential below level B, namely to the left of vertex 9, causes the now common voltage of collector 13 and emitter 11 to fall linearly at the same rate as the change in emitter voltage which occurred in range A—B of FIGURE 6.

At voltage level C, the input potential is equal to $E_c$ of collector potential source 14, and accordingly, both junctions of transistor 10 become forward biased to form a double diode. A further decrease in the voltage applied to base 12 results in a reversal in the direction of current flow through collector load 16 such that it now flows toward collector 13. Thus, the voltage drop across collector load 16 is subtracted from potential $E_c$ and the common collector and emitter voltage continues to decrease with a further reduction in the input potential below level C. This process is limited only by the current handling capabilities of the base-emitter and base-collector junctions of transistor 10.

Once again, while collector load 16 was selected substantially larger than emitter load 17 and two, rather than one, potential sources are employed, the circuit is obviously not so limited. The magnitude of collector load 16 may be varied to change the width of range A—B. In the particular example illustrated in FIGURES 5 and 6, the magnitude of collector load 16 has been chosen to provide a narrow range A—B for reasons which will be subsequently understood. As previously described in connection with the circuit of FIGURE 1, the width of range A—C and its position relative to the zero origin may be changed by varying the magnitude of emitter and collector potential sources 15 and 14 separately or simultaneously. Additionally, while both the basic circuits of FIGURES 1 and 5 have illustrated the collector load as interposed between the collector electrode and supply potential source, similar results may also be realized by transposing the source and collector load.

The circuit of FIGURE 5 is particularly attractive as a noise cancellation apparatus for incorporation in a conventional television receiver. In such receivers extraneous spurious noise pulses which exceed the peak amplitude of the synchronizing pulses, and are of finite time duration, often result in deleterious effects in that it is difficult under such conditions to maintain proper synchronization of the scanning systems. It has therefore been found desirable to provide apparatus for eliminating or cancelling the effect of such noise pulses before application of the synchronizing signals to the horizontal and vertical scanning generators.

Figure 7:
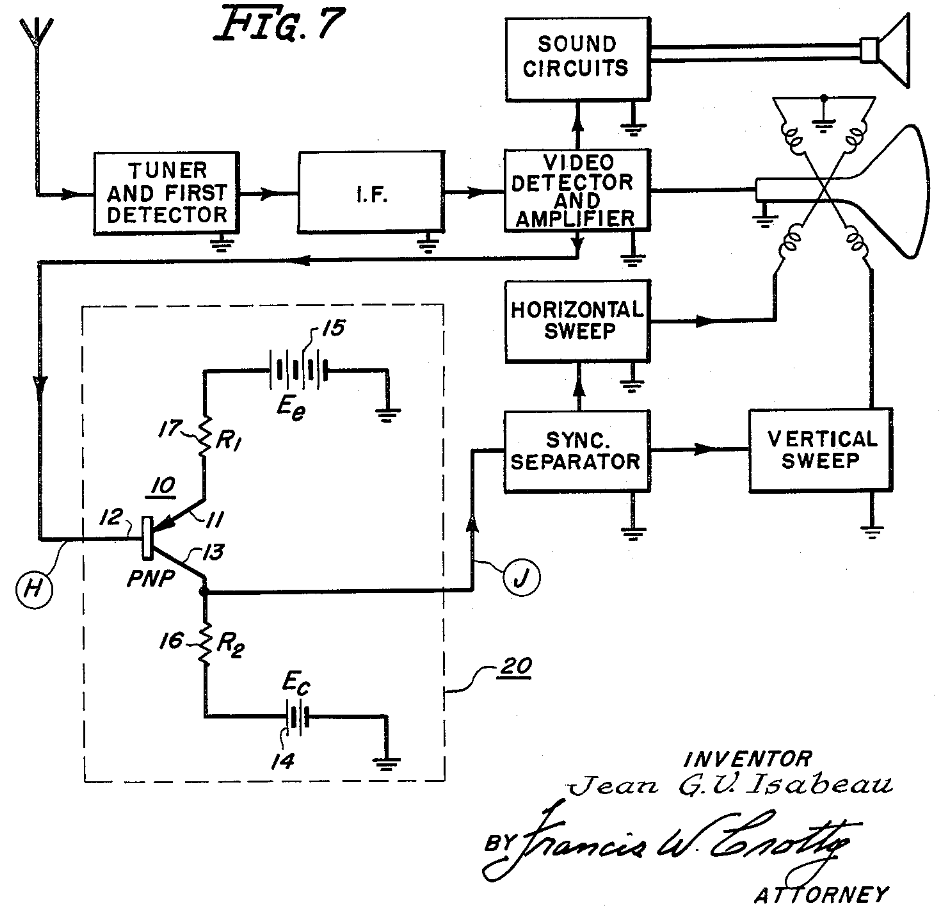
FIGURE 7 illustrates the circuit of FIGURE 5 as it may be included in a conventional television receiver.

Consideration will now be given to FIGURE 7 which illustrates the utilization of the circuit of FIGURE 5 for achieving noise cancellation in a conventional television receiver. With the exception of the noise cancellation circuit, designated by the dashed block, 20, the receiver is conventional in all respects and therefore has been shown only in block form. Base 12 of transistor 10 is connected to the video amplifier in well known manner, and the signal appearing on collector 13 is applied to the synchronizing signal separator which in turn supplies synchronizing pulses to the scanning circuits.

Figure 8:
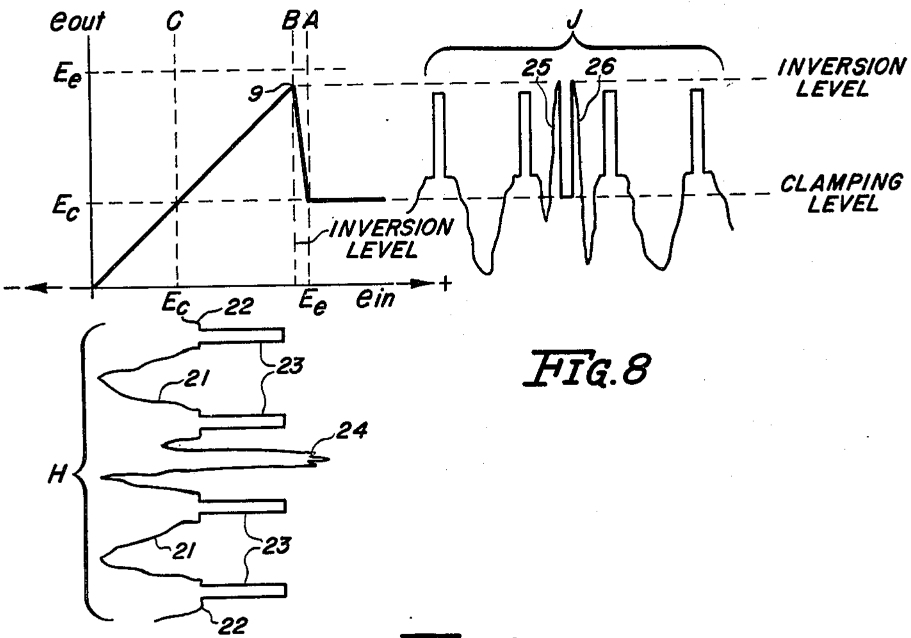
FIGURE 8 illustrates the collector voltage transfer characteristic of the circuit of FIGURE 7 along with wave form representations of certain signals appearing at different points in the receiver of FIGURE 7.

The operation of noise cancelling circuit 20 may best be understood by reference to FIGURE 8. A composite video signal is shown by curve H and includes video components 21 of varying amplitude within an amplitude range below a predetermined blanking pedestal level 22, and synchronizing-signal components 23 of an amplitude exceeding level 22. The composite video signal is subject to the introduction of extraneous undesired noise pulses, such as that shown by noise pulse 24, of greater amplitude than the synchronizing-signal components 23. Base 12 is biased in such a manner that level C lies slightly below blanking threshold level 22 while the amplitude of the composite signal is adjusted so that the peaks of the synchronizing pulses 23 fall slightly below inversion level B.

Stated in another way, the composite video signal is so adjusted that the amplitude range from pedestals 22 to the peaks of associated synchronizing pulses 23 is of a magnitude slightly less than that encompassed by range C—B, while the position of the composite video signal, relative to the base-to-collector voltage characteristic of transistor 10, is adjusted such that level B falls slightly above the peaks of sync pulses 23. In other words, the composite video signal of curve H has an amplitude characteristic (sync peaks) that is established at a particular operating point (namely, slightly less than level B) on the transfer characteristic with respect to vertex 9. In this way, the desired video and synchronizing components fall completely within the portion of the transfer characteristic below or to the left of the vertex and the undesired noise components fall predominantly in the portion of the transfer characteristic above or to the right of the vertex 9.

When driven with such a composite signal containing noise pulses of sufficient amplitude and duration to adversely influence the operation of the sweep system, circuit 20 is effective to provide an output voltage on collector 13 including all of the desired video and synchronizing information but with the undesired noise substantially removed, as represented by the output wave form J in FIGURE 8. Noise cancellation is effected since the input composite video signal of curve H, with the exception of noise pulse 24, is of an amplitude to cause transistor 10 to operate over the linear portion of the transfer characteristic existing between the zero origin and the vertex or level B. Accordingly, the input wave form appears unaltered on collector 13. Noise impulses like 24, however, exceed vertex 9 or inversion level B, and, assuming the transistor is of the "fast" type so that the charge storage effects are ignored, drive transistor 10 out of the saturation or short-circuit mode, through the amplifier mode of range B—A, and to cutoff. This causes the voltage on collector 13 to fall rapidly through range B—A to the potential of collector source 14. The output voltage variation thus has an instantaneous polarity or phase with respect to that of the input voltage determined by the sense of the amplitude excursions of the input voltage with respect to vertex 9.

Accordingly, during the noise interval the voltage appearing on collector 13 is, in effect, reduced or clamped to the potential $E_c$ which may be designated the clamping level. As a result of this operation, the bulk of noise pulse 24 is removed, leaving only a residue comprising two relatively narrow transient pulses 25 and 26 which are insufficient in amplitude and duration to produce detrimental effects on the operation of the scanning circuits. While noise pulse 24 has been illustrated as occupying a time duration less than a full horizontal line, it should be clear that the same results are realized in the case of a noise pulse of substantially longer duration which may embrace several horizontal or line traces.

Because of the clamping effect of circuit 20 the transfer characteristic of FIGURE 8 may be analyzed as one having a first portion (namely, to the left of vertex 9 or below inversion level B) of a finite slope and of one polarity representing an operating mode in which applied voltages are transmitted in like phase, a second portion (namely, that to the right of the vertex between levels B and A) of a finite slope but of opposite polarity representing an operating mode in which applied voltages are translated in phase opposition, and a third portion (that to the right or above level A) of substantially zero slope representing an operating mode in which applied voltages are clamped to the predetermined clamping potential level $E_c$.

As illustrated, all of the video and sync information falls between the zero vertical axis and level B in FIGURE 8 and therefore appears undistorted in curve J. However, since the signal of curve J is supplied to a sync separator any video distortion is of no consequence; thus the video information may extend beyond (to the left) of the zero axis in FIGURE 8.

Up to this point, it has been assumed that transistor 10 is of the "fast" or high speed type, namely that transistor 10 was selected from that class of semi-conductor devices specifically designed for high frequency operation. In such a device, minority carriers stored in the base region during saturation operation are insufficient to introduce an appreciable delay in the decrease of collector current when the device is driven from saturation to cutoff. If the high speed device is replaced by a relatively "slow" transistor, the stored carriers become appreciable and certain desirable properties are manifest in the circuit of FIGURE 5 which make it particularly attractive for television sync separation applications. In this connection, certain features described herein are also discussed and claimed in copending application Serial No. 748,376, filed concurrently herewith, now Patent 3,006,996, also in the name of Jean G. V. Isabeau, and also assigned to the present assignee.

The effect of stored minority carriers on the ability of a given transistor to serve as a switching device may be described as follows. In a high frequency or "fast" transistor, an input pulse of sufficient amplitude to drive the transistor into the saturation mode is faithfully reproduced in the output without apparent "stretching." Should a low frequency or "slow" transistor be substituted, however, the resulting output pulse will not be of the same duration as the input pulse but will, in effect, be stretched or prolonged by an interval equal to the finite time required for the stored carriers to recombine or be absorbed subsequent to the termination of the input pulse. It should be appreciated that by proper biasing the storage time of any given transistor, "slow" or "fast," may be varied in large proportion, so that it is possible to create a storage time in "fast" transistors comparable to the shortest storage times in "slow" transistors. While this storage effect is an undesirable property in most large-signal transistor applications, since it in effect places an upper limit on the useful frequency range of the circuit, it may be employed to advantage in the circuit of FIGURE 5 to render the circuit useful as a synchronizing-signal separator.

Figure 9:
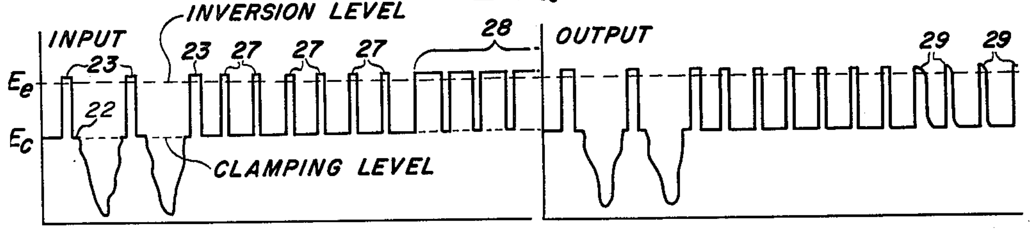
FIGURE 9 shows particular signal wave forms present in the circuit of FIGURE 7 when it is modified in accordance with another embodiment of the invention.
Figure 10:
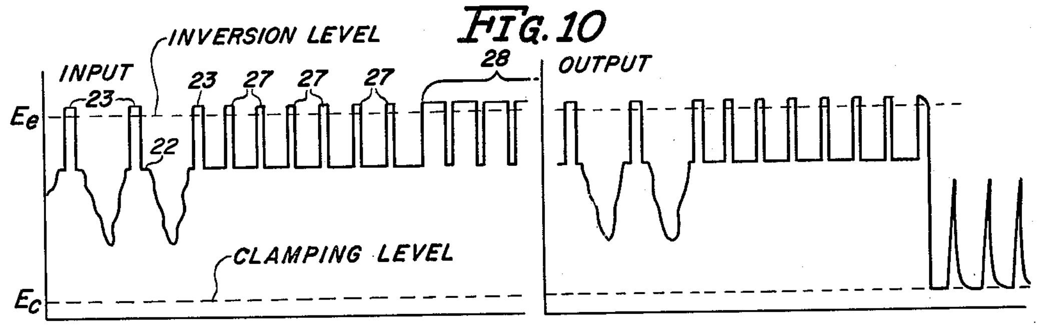
FIGURE 10 illustrates certain signal wave forms pertinent to the circuit of FIGURE 7 as modified according to a still further embodiment of the invention.

The wave forms presented in FIGURES 9 and 10 illustrate two effects obtainable by utilizing this storage phenomenon. To obtain the wave forms of FIGURE 9, the magnitudes of the emitter and collector sources $E_e$ and $E_c$, respectively, in FIGURE 5 are adjusted to provide a clamping level (level C) which is coincident with the blanking pedestal level 22 and an inversion level (level B) which falls slightly below the peaks or tips of the horizontal synchronizing components 23, the peaks of the equalizing pulses 27 and the peaks of the vertical or field-drive components such as the portion of the vertical-drive component designated by 28. Each vertical-drive pulse is, of course, serrated in that it includes a series of pulses individually of greater time duration than that of the horizontal sync pulses. By utilizing a transistor having a storage time slightly in excess of the time duration of each of the horizontal synchronizing pulses 23 but less than the duration of each of the pulses comprising vertical component 28, it becomes possible to remove the vertical or field-synchronizing information 28 from the composite video signal while retaining the horizontal or line information.

As shown in the input signal portion of FIGURE 9 (namely that on the left), since the peaks of both the horizontal and vertical synchronizing pulses exceed the inversion level, the use of a "fast" transistor would result in the loss of all synchronizing information while retaining the video components. The use of a properly biased transistor having the aforementioned finite storage time results in the passage of the horizontal synchronizing information unaltered through the circuit.

This condition arises from the fact that each of the horizontal synchronizing pulses 23 is of insufficient width to permit the stored minority carriers to be absorbed before the termination of the pulse. In contrast, the individual pulses making up a single vertical pulse are of a duration sufficiently long to permit complete carrier absorption, thereby causing the collector voltage to drop to the clamping level after a period substantially equal to the storage time of the transistor. This effect manifests itself in the output wave form shown on the right in FIGURE 9 in the breaking up of the single vertical synchronizing pulse 28 into a series of pulses 29 closely resembling the horizontal synchronizing pulses 23.

Accordingly, the vertical synchronizing information has been removed from the composite video signal while the horizontal synchronizing information has been fully retained. After deletion of the video information from the composite output wave form shown on the right in FIGURE 9 by clamping or by any other appropriate means, the horizontal synchronizing pulses may be applied directly to the horizontal phase detection circuitry without additional wave form modification.

Should the clamping level be lowered to a value appreciably below the maximum white level of the video signal, as is illustrated in FIGURE 10, the circuit is useful in providing both horizontal and vertical synchronization information. As shown in the output wave form on the right, by so reducing the clamping level a substantial variation results in the amplitude range covered by the horizontal synchronizing pulses compared to that covered by the pulses derived from the vertical synchronizing pulse 28. By applying the resultant composite output wave form to appropriate amplitude sensitive circuits, both horizontal and vertical synchronizing pulses may be easily separated.

Accordingly, it should be clear that by utilizing a "slow" or low frequency transistor presenting storage and by properly adjusting the inversion and clamping levels, the circuit of FIGURE 5 may be used to provide an output wave form containing horizontal synchronizing information alone or both horizontal and vertical synchronizing pulses in a form which readily lends itself to subsequent separation by means of suitable circuitry.

Figure 11:
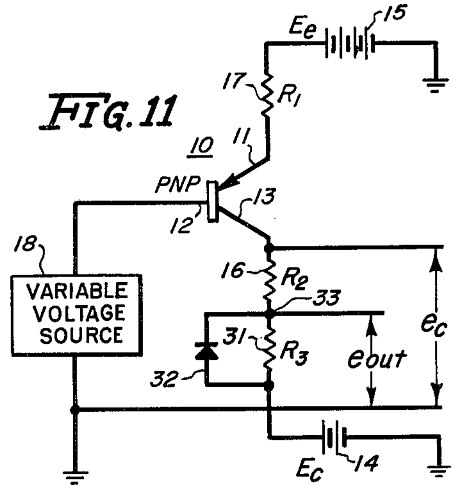
FIGURE 11 is another signal-translating circuit arranged in accordance with an additional embodiment of the invention.
Figure 12:
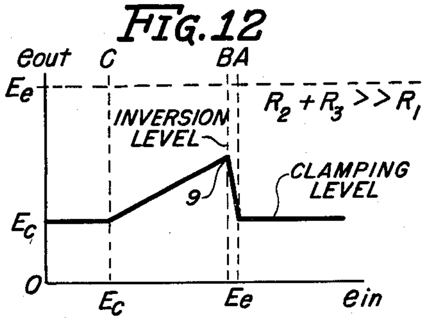
FIGURE 12 illustrates the input-output voltage transfer characteristic of the circuit of FIGURE 11.

The circuit shown in FIGURE 11 is identical to that illustrated in FIGURE 5 and also uses a PNP transistor with the exception that an additional collector resistor 31 having a resistance value of $R_3$ and a bridging or shunting semi-conductor diode 32 have been added between collector resistor 16 and collector source 14. Diode 32 is arranged polarity-wise in a manner such that its normal direction of current conductivity is toward collector electrode 13. Both transistor 10 and diode 32 are of the "slow" type and are selected and biased such that the storage time of each is substantially equal under present circuit conditions. The addition of these two elements to the circuit of FIGURE 5 provides a voltage transfer characteristic, between base 12 and the junction of collector resistors 16 and 31 (designated for convenience of explanation point or terminal 33 in FIGURE 11) with ground as a reference, of the type shown in FIGURE 12. It is immediately apparent that this transfer characteristic is basically the same as that shown in FIGURE 6 with two exceptions. Firstly, its slope in range B—C is reduced as compared with the corresponding range in FIGURE 6 as a result of the voltage divider action of collector resistors 16 and 31. Secondly, at input voltages below level C (namely less positive than voltage $E_c$) the potential at terminal 33 remains constant due to the presence of diode 32.

To explain further, assume initially that the voltage applied to base 12 is positive relative to ground and of a magnitude which exceeds the magnitude $E_e$ of emitter potential source 15. Under this condition both the base-emitter and base-collector junctions are back or reverse biased and no current flows in the emitter or collector circuit. Accordingly, the voltage appearing at terminal 33 is equal in magnitude to potential $E_c$ of collector potential source 14. A reduction in the magnitude of the input voltage such that it falls in range A—B effects forward biasing of the base-emitter junction, resulting in current flow in the collector circuit (in the direction toward collector source 14) which results in a rise of the output voltage at terminal 33. Once again, by selecting the combined magnitudes of collector resistors 16 and 31 to be substantially larger than emitter resistor 17, for example 10 to 1, range A—B is made relatively narrow.

If the input voltage $e_{in}$ is further decreased to level B, the collector and emitter voltages assume substantially equal values and transistor 10 passes from the amplifier operation to the saturation or short circuit mode of operation. Accordingly, a further reduction in the input voltage $e_{in}$ effects a decrease in the potential appearing on collector 13 with a corresponding decrease in the voltage appearing at terminal 33. At level C the input voltage is equal to the voltage $E_c$ of collector potential source 14, and any further reduction in input signal results in forward biasing of the base-collector junction and a consequent reversal of collector current flow. That is to say, collector current flows in a direction toward collector electrode 13. In the absence of diode 32, the voltage appearing at terminal 33 would decrease under these conditions but in the presence of the diode the potential at terminal 33 does not decrease below the value $E_c$ since diode 32 now conducts and effectively clamps terminal 33 to potential $E_c$ of source 14.

Figure 13:
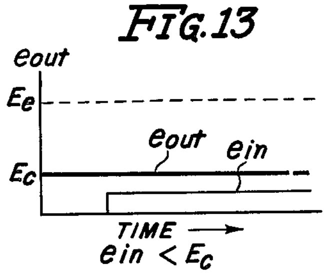

The effects of carrier storage in transistor 10 and diode 32 may best be understood by reference to the graphical representations of FIGURES 13–16 which illustrate the output voltage $e_{out}$ between terminal 33 and ground plotted against time. In each of these figures the input signal applied to base 12 is a step voltage having a steep or abrupt leading edge; its amplitude varies from figure to figure. FIGURE 13 represents the voltage appearing at terminal 33 when the input step wave is of a magnitude less positive than both the magnitude $E_c$ of collector potential source 14 and the magnitude of $E_e$ of emitter source 15. Prior to the application of this step wave, both the base-emitter and base-collector junctions are forward biased by sources 15 and 14, respectively, and diode 32 conducts. The output voltage is thus clamped at potential $E_c$. The application of a step voltage wave of such a relatively small magnitude produces no appreciable effect on the circuit since the base-collector junction continues to be forward biased and diode 32 continues to conduct, maintaining the potential at terminal 33 equal to that of collector potential source 14.

Figure 14:
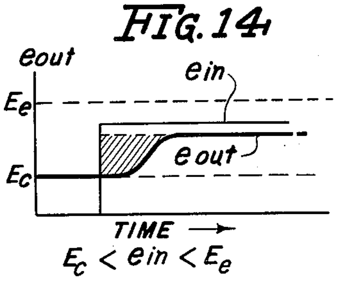

FIGURE 14 illustrates the voltage appearing at terminal 33 in response to a step input voltage wave of an amplitude falling within range B—C. Prior to the application of the impulse, $e_{out}$ is clamped to potential $E_c$ because of the forward biasing of the base-collector junction with the consequent conduction of current through diode 32 toward collector 13. The step voltage causes the base-collector junction to be reverse biased, the base-emitter junction remaining forward biased. If the diode is a "fast" or high frequency device, exhibiting no significant charge-carrier storage effects, the collector current reverses and causes the voltage at terminal 33 to rise instantaneously and concurrently with the application of the step wave input to a value determined by the electrical size of the collector resistors 16 and 31. If, however, semi-conductor diode 32 exhibits an appreciable storage time, an instantaneous rise of the output voltage is prevented since the reverse collector current continues to flow through diode 32 toward source 14 for the interval of time required for the stored carriers of the diode to be fully absorbed. The delay in the voltage rise as a result of this storage effect is shown in FIGURE 14 by the shaded section, the area of which is a function of the magnitude of the current flow through the diode at the instant the impulse is applied and its frequency cut off.

Figure 15:
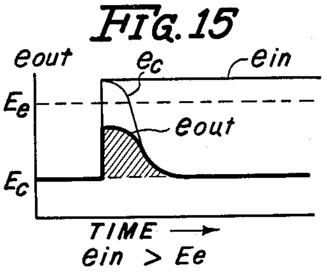

FIGURE 15 demonstrates the response of the circuit to a step input voltage having an amplitude which exceeds potential $E_e$ of emitter potential source 15. Again, prior to the application of this step voltage both the base-emitter and base-collector junctions are forward biased resulting in saturation of transistor 10 and conduction of diode 32. the $e_{out}$ curve shown in FIGURE 15 shows the resulting wave form upon application of the step voltage wave if diode 32 is of the high frequency variety, exhibiting minimum storage. Upon application of the step input, both the base-emitter and base-collector junctions are instantaneously reverse biased which, if transistor 10 were also of the high frequency variety, would instantaneously terminate the current flow in both the emitter and collector circuits. As a consequence of the stored carriers in the transistor, however, immediate cutoff cannot occur and this effects current flow through the emitter-collector conduction path (toward source 14), causing the voltage at terminal 33 to rise coincident with the application of the step voltage wave to a value determined by the parameters of the circuit. For a period of time equal to that required for the absorption of the stored carriers of the transistor, progressively decreasing current flows in both the emitter and collector circuit, causing the output potential $e_{out}$ at terminal 33 to return to level $E_c$ of source 14. The voltage variation at terminal 33 resulting from the storage effect in transistor 10 is shown by the shaded area in FIGURE 15. The voltage wave form $e_c$ appearing between collector 13 and ground is also shown in FIGURE 15. It follows $e_{out}$ but is of higher amplitude due to the voltage drop across resistor 16.

Figure 16:
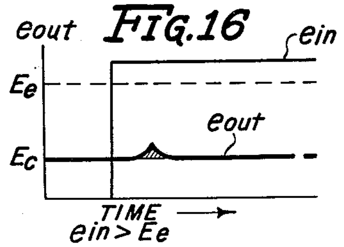
FIGURES 13–17 depict various signal curves useful in explaining the operation of the circuit of FIGURE 11.

FIGURE 16 graphically explains the operation of the circuit of FIGURE 11 if both transistor 10 and diode 32 are low frequency or "slow" devices having storage times which are substantially equal. As can be seen, the effect of storage in transistor 10 is cancelled by that taking place in diode 32, thus resulting in substantially constant output voltage. A small transient is all that remains and this occurs as a result of an inability to obtain directly matching storage characteristics in both devices.

To elucidate, before the application of the step voltage wave to base 12, both the base-emitter and base-collector junctions are forward biased under the influence of emitter potential source 15 and collector potential source 14 as in the case of FIGURES 13–15. Consequently, current flows in both the emitter and collector circuits. Current flow in the collector circuit is in such direction that diode 32 conducts and terminal 33 is clamped to voltage $E_c$ of source 15. Upon supplying the step voltage wave to the input, both junctions of the transistor are instantaneously reverse biased tending to immediately terminate current flow in both the emitter and collector circuits. This is not possible, however, due to the minority carrier storage in transistor 10 and hence current continues to flow in the emitter circuit and the collector circuit but with reversed direction (namely toward source 15 and also toward source 14) for an interval of time equal to the time required for the carriers stored in transistor 10 to be fully absorbed. Such reversed current flow in the collector circuit does not produce an appreciable rise in the output voltage appearing at terminal 33 due to the clamping action provided by carrier storage in diode 32. In fact, diode 32 is free to translate current in a reverse direction toward source 14 for a period equal to the time required for the stored carriers to be fully absorbed. Since the storage times of transistor 10 and diode 32 are purposely chosen to be substantially equal, carrier absorption in both devices occurs for substantially the same period of time. This causes the voltage change, which takes place at terminal 33 as a result of the input step voltage wave, to be transient in nature as shown by the shaded area in FIGURE 16.

The circuit of FIGURE 11, including the following components, has been constructed and operated very satisfactorily:

| | | |
|---|---|---|
| Resistor 17 | ohms | 1500 |
| Resistor 16 | do | 470 |
| Resistor 31 | do | 15K |
| Diode 32 | | 1N91 |
| Transistor 10 | | 2N94A |
| Source 15 | volts | 2 |
| Source 14 | do | 1 |

Figure 17:
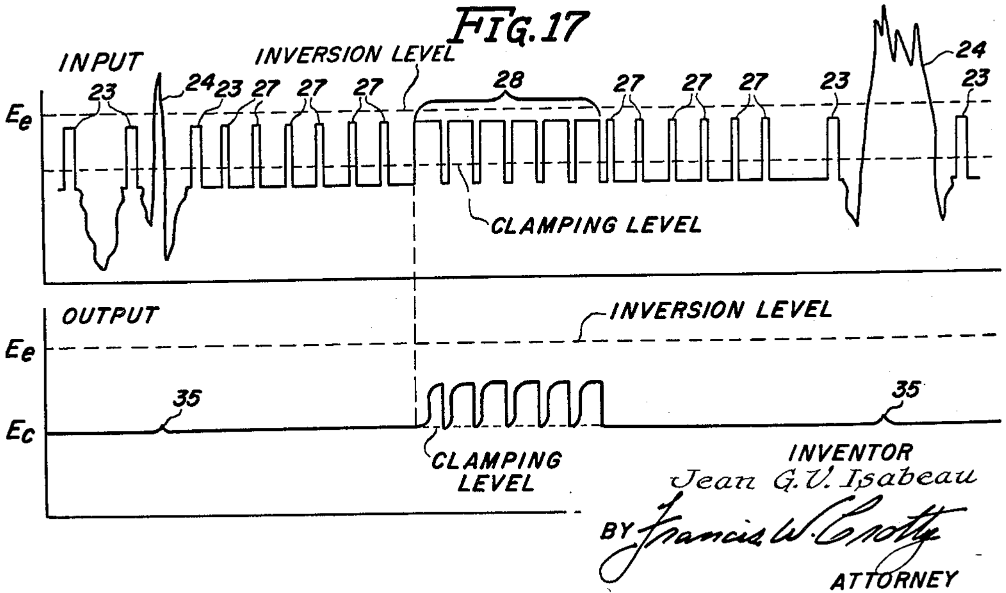

The circuit of FIGURE 11 is useful as a synchronizing separator for a television receiver since it is capable of producing an output signal containing only vertical synchronizing information when driven by a composite video signal, for example, that shown on the top of FIGURE 17, including objectionable noise in addition to the conventional signal components. As explained previously in connection with the wave forms of FIGURES 8–10, the composite video signal shown in FIGURE 17 includes the customary horizontal-synchronizing components 23, equalizing pulses 27, a vertical-synchronizing component 28 divided into and consisting of a number of individual pulses each of a time duration exceeding that of the horizontal synchronizing pulses 23, and noise components 24. If transistor 10 and diode 32 are "slow" devices having substantially equal storage times of a duration which exceeds the width of the horizontal-synchronizing pulses 23, but less than the time duration of each of the individual pulses making up vertical-synchronizing component 28, an output signal having the general form shown on the bottom of FIGURE 17 is obtained.

As applied to transistor 10, the input composite video signal is positioned relative to the clamping and inversion levels C and B, respectively, such that the inversion level is slightly above the amplitude peaks of the horizontal and vertical-synchronizing pulses while the clamping level lies above the upper limit of the pedestals, as in the case of FIGURE 8. Thus, the peaks of the sync pulses fall within the saturation mode of operation. Since the horizontal-synchronizing pulses 23 and equilizing pulses 27 are of insufficient duration to permit the minority carriers stored in transistor 10 and diode 32 during saturation operation from being completely absorbed, the output voltage appearing at terminal 33 remains substantially constant and clamped to potential $E_c$. The pulses comprising each vertical-synchronizing component 28 are, however, of substantially longer duration than the horizontal or equalizing pulses. As a consequence, the charge storage is swept out of transistor 10 and diode 32 within the duration of each pulse making up field synchronizing component 28 and when that occurs, the potential of collector 13 and the collector load drops toward the reference level $E_c$. Therefore, these pulses appear in the output but their width is reduced by the time increment required for the stored carriers to be absorbed.

As illustrated, one of the two noise bursts 24 received with the composite video input signal, the one on the left in FIGURE 17, is of a duration substantially less than a horizontal- or line-trace interval, and the other has a time interval substantially in excess of a horizontal-scanning period. By means of the operation explained in connection with FIGURE 16, both bursts 24 are, in effect, cancelled, leaving only the small transient disturbances 35 in the output signal. Accordingly, by properly selecting the storage times of transistor 10 and diode 32 in FIGURE 11, the circuit functions as a vertical synchronizing signal separator providing an output signal wave form which contains the vertical synchronizing information substantially stripped of all horizontal synchronizing, video and noise which may be included in the composite video signal.

Figure 19:
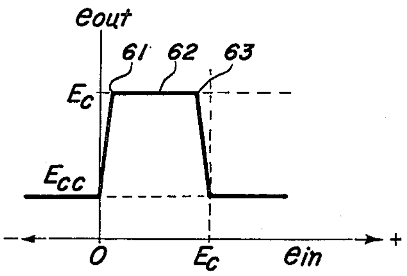
FIGURE 19 represents the voltage transfer characteristic of the circuit of FIGURE 18.

The basic transistor circuit so far described may be further modified in the manner of FIGURE 18 to provide an input-to-output voltage transfer characteristic of the type represented in FIGURE 19. This characteristic, however, rather than being triangular in form with a definite vertex defining the point at which applied voltages change phase in the output, is substantially rectangular, having relatively short ranges of positive and negative slope. The common interconnecting portion joining the two portions of opposite slope takes the form of a zero slope portion covering a relatively wide range rather than a point vertex as in the previous embodiments. Essentially the characteristic of FIGURE 19 is obtained by employing a circuit like that shown in FIGURE 1 to provide a triangular shape characteristic plus a limiter to effectively slice only a part of the opposite slope portions. By so doing, the opposite slopes are joined at one end by a zero slope portion and the other ends terminate in additional zero slope portions.

A circuit having a transfer characteristic of this type is extremely useful in television applications as a noise immune synchronizing-signal separator producing an output signal consisting of the horizontal and vertical-synchronization information and devoid of substantially all noise and video components.

In FIGURE 18, the collector load resistor of transistor 10 is a series circuit including a resistor 37 and the base-emitter junction of a second transistor 40 of the PNP type. Emitter electrode 11 of transistor 10 is returned, through emitter load 17, to ground rather than to a positive potential source. Collector electrode 41 of transistor 40 is returned to the positive terminal of a unidirectional potential source 42 through a collector load resistor 44 having a resistance of value $R_4$. Collector potential source 42 is chosen of a magnitude $E_{cc}$ significantly smaller than potential $E_c$ of source 14. The negative terminals of both source 14 and 42 are connected to ground. Actually, the only requirement is that the point to which resistor 44 is returned be more negative than the positive terminal of source 14.

The voltage transfer characteristic illustrated in FIGURE 19 is that from base electrode 12 of transistor 10 to collector electrode 41 of transistor 40 with ground as a reference. Prior to the application of a voltage to base 12 of transistor 10 only leakage currents are present in the emitter and collector circuits of transistor 40. Therefore, the voltage at collector 41 is constant and of a magnitude substantially equal to the voltage $E_{cc}$ of collector potential source 42. If input voltage source 18 is now adjusted to apply a slight positive voltage to base electrode 12, the base-emitter junction of transistor 10 becomes forward biased thereby causing collector current to flow through the base-emitter junction of transistor 40 in the direction from source 14 to base 46. This, in turn, initiates current flow in collector load resistor 44 toward source 42 as a result of the potential difference existing between emitter source 14 and collector source 42. The presence of this current through resistor 44 causes the voltage appearing on collector 41 to rise from the value $E_{cc}$ of source 42 due to the voltage drop across resistor 44 by an amount determined by the magnitudes of collector resistor 44 and the positive voltage applied to base 12 of transistor 10. A further increase in the voltage applied to base 12 effects a further increase in the voltage appearing on collector 41. In other words, both transistors serve as amplifiers.

If the resistance $R_4$ of resistor 44 is chosen sufficiently large, the slope of the voltage change on collector 41 will be relatively steep (the steepness is proportional to the base-to-collector current gain B of transistor 40 multiplied by $R_4$ and divided by $R_1$ and this ratio preferably should equal at least ten) resulting in saturation of transistor 40 at a relatively low input positive voltage to base 12 of transistor 10, specifically at point 61 in FIGURE 19. Upon attaining saturation, collector 41 is, in effect, clamped to the voltage $E_c$ of source 14, since at that time there is no appreciable potential difference across the emitter-collector conduction path of transistor 40. The voltage on collector 41 remains substantially constant at a magnitude $E_c$ for additional increases in the applied input voltage. At some input signal level, for example that designated by 62 in FIGURE 19, transistor 10 becomes saturated, at which time the voltage on collector 13 begins to follow that on base 12. A level is eventually reached at which the potential appearing on base 46 of transistor 40 is very nearly equal in magnitude to voltage $E_c$. This will happen when $e_{in}$ is very close to $E_c$, designated 63 in FIGURE 19. A further increase in the applied voltage $e_{in}$ causes transistor 40 to shift back (desaturate) from its saturation mode to its amplifier mode and the voltage appearing on collector 41 consequently decreases in magnitude. When the input voltage $e_{in}$ reaches the magnitude $E_c$ of source 14, the base-emitter junction of transistor 40 becomes back or reverse biased thereby causing the current in collector load resistor 44 to be terminated and the voltage appearing on collector 41 to once again assume level $E_{cc}$. Additional increases in the applied input voltage have no effect on the collector voltage of transistor 40 since they serve only to increase the level of reverse or back bias of the base-emitter junction.

Accordingly, the overall voltage transfer characteristic of the circuit of FIGURE 18 is such that the application of a voltage in the range of zero to the level $E_c$ of emitter potential source 14 causes the potential appearing on collector 41 to rise sharply from level $E_{cc}$ to that of $E_c$. The application of a voltage outside this range causes no change in the output potential. In other words, the transfer characteristic is of the "aperture" type. There are sharp changes between minimum and maximum at the start and end of a range between levels 61 and 63 at which the response is flat.

The following circuit parameters were utilized in a circuit constructed and operated in accordance with the teachings of FIGURE 18:

| | | |
|---|---|---|
| Resistor **17** | ohms | 1500 |
| Resistor **37** | do | Zero |
| Resistor **44** | do | 3300 |
| Source **42** | volts | —6 |
| Source **14** | do | 1.5 |
| Transistor **10** | | 2N94A |
| Transistor **40** | | 2N43 |

FIGURE 20 shows the manner in which the circuit of FIGURE 18 may be incorporated into a television receiver to achieve synchronizing signal separation. All of the circuitry with the exception of that contained in dashed block 48 is conventional and need not be explained in detail. A composite video signal is derived in customary manner from the video detector and amplifier section of the receiver and is applied to base electrode 12 of transistor 10. The signal appearing on collector 41 of transistor 40 is applied to both the horizontal and vertical-scanning systems. As shown in FIGURE 21, the amplitude and position of the composite video signal with respect to the voltage transfer characteristic of circuit 48 is chosen such that the blanking pedestal level coincides with the vertical axis or zero input, with the synchronizing pulses going in a positive direction and such that the peaks of the sync pulses are somewhat below level $E_c$ of source 14. All that is actually required is for the sync tips to reach some level in the flat portion between points 61 and 63. The blanking pedestal level may be negative with respect to ground or the vertical axis. The levels of source 14 and source 42 are the inversion and clamping levels, respectively.

If transistors 10 and 40 are selected as "fast" devices, the output wave form appearing on collector 41 is as shown in FIGURE 21. The ranges of the composite video input signal which lie below the blanking pedestals are of a polarity to reverse or back bias the emitter junction of transistor 10 and therefore do not effect the voltage appearing on collector 41, which is $E_{cc}$ during such intervals. The synchronizing pulses project into the rectangular portion of the transfer characteristic between points 61 and 63 and therefore cause the voltage appearing on collector 41 to rise to level $E_c$. No matter at what level the sync tips reach between points 61 and 63 and, moreover, even if individual synchronizing pulses vary in peak amplitude, the output pulses always have the same amplitude. The noise bursts 24 shown are of an amplitude substantially greater than the peak amplitude of the synchronizing pulses; they exceed the inversion level $E_c$ and cause the voltage appearing on collector 41 to fall rapidly to the clamping level $E_{cc}$. As a result of this action, constant amplitude vertical- and horizontal-synchronizing pulses are produced in the output, substantially free of video components and with the noise bursts 24 appearing only as short transients 51 of insufficient amplitude or duration to materially affect the synchronization of the sweep system. Of course, the field- and line-synchronizing components may be effectively separated from one another by customary circuitry.

The circuit of FIGURE 22 is exactly like that shown in FIGURE 18 with the exception that a diode 64 shunts the base-emitter junction of transistor 40. Diode 64 is arranged polarity-wise such that it normally conducts current toward source 14 from collector 13. Assuming, for the moment, that diode 64 is absent and transistor 10 is of the "fast" type, a relatively high amplitude input pulse, like that shown by pulse 65 in FIGURE 23, applied between base 12 and ground initially instantaneously switches the operating mode of the entire circuit from that defined by the transfer characteristic of FIGURE 23 to the left of the vertical axis to the mode represented by the curve of the right of level $E_c$, and subsequently instantaneously switches the mode back to that represented to the left of the vertical axis. Therefore, ignoring possible transient pulses, there would be no output signal in response to pulse 65 since the potential at collector 41 remains substantially at potential $E_{cc}$.

Assuming now that transistor 10 does exhibit charge storage to an appreciable degree, the application of a pulse like pulse 65 creates storage of minority carriers in the base of transistor 10 due to saturation current flowing from base 12 to collector 13, which are not wiped out instantaneously upon termination of pulse 65. That being the case, in the absence of diode 64 current would actually flow through the base-emitter junction of transistor 40 in the direction of base 46 immediately subsequent to the termination of pulse 65 and during the storage time of transistor 10. A pulse like that designated 66 would thus be developed at collector 41 without diode 64. The conduction of current through the base-emitter junction of transistor 40 clamps collector 41 to potential $E_c$; thus, pulse 66 has an amplitude of $E_c$. Since pulse 66 would follow pulse 65 in time, the latter pulse has been shown in dashed line construction as preceding pulse 66. A transient 67 would also be produced coincident with the leading edge of pulse 65.

By employing diode 64 and adjusting it to exhibit a storage time substantially identical to that of transistor 10, the application of pulse 65 to base 12 results in only a relatively negligible output pulse 68 shown in FIGURE 23. This obtains since diode 64 conducts normally during the peak of pulse 65 in the direction toward source 14. However, the current which would be flowing through the base-emitter junction of transistor 40 during the storage time of transistor 10 now flows through diode 64 in the same direction (namely away from course $E_c$ toward collector 13) due to the storage effects of the diode and during a time interval equal to the storage time of transistor 10. The diode thus acts as a low impedance bypass for the emitter junction of transistor 40. If the storage times of diode 64 and transistor 10 are prefectly matched pulse 68 would disappear entirely. The bypassing action of diode 64 may be, if required, further enhanced by introducing a resistance in series with the base terminal 46 and the junction of resistor 37 and diode 64.

The aperture circuit of FIGURE 18 may be modified as shown in FIGURE 24 to provide a transfer characteristic that not only essentially accepts only input signals reaching a predetermined range but further divides that range into two portions of opposite polarity slope as shown in FIGURE 25. This is achieved simply by interposing resistor 70 having a resistance value of $R_5$ between the emitter of transistor 40 and source 14. Resistance value $R_4$ is made substantially larger than value $R_5$.

By such a modification the advantages of FIGURES 18 and 1 are effectively combined. Resistor 70 is analogous to resistor 16 and transistor 10 is analogous to the similarly numbered transistor in FIGURE 1. Levels 61 and 63 in FIGURE 25 correspond to the same levels represented in the transfer characteristic of FIGURE 19, namely levels 61 and 63 indicate the input voltage range level during which transistor 40 acts as a short circuit or saturates. The portions of the transfer characteristic just preceding 61 and following 63 correspond to operation of transistor 40 as an amplifier. As in the case of FIGURE 19, level 62 in FIGURE 25 also indicates the point at which transistor 10 ceases to function as an amplifier and becomes short circuited or saturated. In this instance, however, it will define the vertex of opposite slope portions starting at points 61 and 63, respectively.

To explain further, after transistor 40 becomes short circuited (namely, at level 61) collector 41 begins to follow base 46 and consequently collector 13. Resistor 37 is considered to be of zero value in this explanation. Until the input voltage reaches level 62 transistor 10 is in the amplifying mode, effecting an 180° phase shift from base 12 to collector 13. Consequently, between levels 61 and 62 the input signal variations are translated to collector 41 in opposite phase.

At level 62, however, transistor 10 becomes saturated and thus collector 13 follows base 12 and, since transistor 40 is still short circuited, collector 41 also effectively follows collector 13. Thus, the slope of the transfer characteristic between levels 62 and 63 is of opposite polarity from that immediately preceding level 62 since applied signal variations are reproduced at collector 41 in like phase. As in the case of the previous figures, vertex 62 may be varied within the range between levels 61 and 63 merely by changing the relation of resistors 17 and 70.

A still different variation of the signal transfer characteristic may be realized by further modifying the basic circuit of FIGURE 18. As shown in FIGURE 26, potential source 14 has been divided into two equal portions, designated 14*a* and 14*b* with each providing a potential of $$\frac{E_c}{2}$$

Equal division is not, however, essential. Resistor 70 is interposed between the emitter of transistor 40 and the positive terminal of source 14*a*. The junction of sources 14*a* and 14*b* is connected by means of a resistor 71, having a resistance value of $R_6$, to collector 41 and is also connected by means of a resistor 75, having a resistance value of $R_7$, to collector 13. The negative terminal of source 14*b* is connected to ground, and as in the case of FIGURE 18 the output signal is developed at collector 41. Source 42 and resistors 37 and 44 are, of course, absent in the circuit of FIGURE 26.

Transistor 10 in combination with battery 14*b* and resistors 17 and 75 constitute a circuit similar to that shown in FIGURE 1 and consequently give rise to a transfer characteristic of the type shown in FIGURE 2. On the other hand, transistor 40 in conjunction with battery 14*a* and resistors 70 and 71 form a circuit similar to that illustrated in FIGURE 5 and thus, considered alone, provide the transfer characteristic illustrated in FIGURE 6. The circuit in FIGURE 26 is essentially a cascading of the circuits in FIGURES 1 and 5.

If resistance value $R_7$ is made much greater than value $R_1$ and resistance value $R_6$ is chosen much greater than value $R_5$, the transfer characteristic of FIGURE 27 is realized with the circuit of FIGURE 26. To the left of the vertical axis in FIGURE 27 the input potential is negative with respect to ground and thus transistor 10 is cut off, which in turn causes transistor 40 to be saturated. The output potential is consequently very close to $$\frac{E_c}{2}$$

since there will be negligible current flow through, and thus a negligible voltage drop across resistor 71. As the input voltage becomes positive with respect to zero or ground potential, transistor 10 becomes conductive to function as an amplifier. Transistor 40 is still saturated and therefore collector 41 effectively follows collector 13. The transfer characteristic is consequently of negative slope such that the output voltage is of opposite phase from that of the input. Level 73 is very soon reached at which transistor 10 also becomes saturated. Between levels 73 and 74 on the transfer characteristic of FIGURE 27 a positive slope is assumed since both transistors 10 and 40 are short circuited or saturated, collector 41 thereby effectively following base 12. The applied signal variations are therefore translated in like phase between levels 73 and 74.

At level 74, however, the voltage on base 46 approaches the potential of the emitter source 14*a* of transistor 40 and thus transistor 40 comes out of saturation and begins to operate in its amplifying mode. Shortly thereafter when the input voltage level reaches potential $E_c$ transistor 40 cuts off entirely even though transistor 10 remains saturated, and the output potential once again assumes the value $$\frac{E_c}{2}$$

In this example the particular relationship of resistance values has been chosen to insure that the transfer characteristic portions immediately preceding level 73 and immediately following level 74 are very sharp.

The transfer characteristic of FIGURE 27 may be used to advantage when for example, it is desired to amplify signal variations within a predetermined range and when it is also desired to clamp potentials lower or higher than that range to a predetermined constant potential, such as is the case in certain limiters.

The invention provides, therefore, a novel basic transistor circuit which may be utilized in various environments and in various modified forms to accomplish exceedingly beneficial results with a minimum of circuitry.

While particular embodiments of the invention have been shown and described, modifications may be made, and it is intended in the appended claims to cover all such modifications as may fall within the true spirit and scope of the invention.

I claim:

1. Signal-translating apparatus comprising: a function-type transistor having a base, an emitter and a collector and having a signal-transfer characteristic dependent upon applied operating potentials and load impedance associated with said transistor; a load impedance coupled to said emitter; a load impedance coupled to said collector; means coupled in series with said emitter and collector loads for applying unidirectional operating potentials to said transistor, said apparatus having an input voltage-output voltage transfer characteristic from said base to said collector, relative to a plane of reference potential, having two portions of opposite slope and a common interconnecting portion; and means including a voltage source for applying between said base and said plane of reference potential an input signal having a reference amplitude level established at an operating point on said characteristic such that the envelope of said input signal embraces at least a part of each of two of said portions of said transfer characteristic whereby the phase of an output signal developed across said collector load is determined by the sense of amplitude excursions of said input signal relative to said common interconnecting portion.

2. Signal-translating apparatus comprising: a junction type transistor having an emitter, a base and a collector; a two-terminal emitter load one terminal of which is connected to said emitter; a collector load coupled to said collector; a source of unidirectional supply potential coupled in series with said emitter and said collector loads, said apparatus having an input voltage-output voltage transfer characteristic, from said base electrode to said collector with the other terminal of said emitter load as a reference, having two portions of opposite polarity slope joining at a common interconnecting portion; and means including a voltage source for applying between said base and said other terminal of said emitter load a varying input voltage having an amplitude characteristic established at a particular operating point on said transfer characteristic with respect to said interconnecting portion such that the envelope of said input signal embraces at least a part of each of said opposite polarity slope portions of said transfer characteristic to produce between said collector and said other terminal of said emitter load an output voltage having an instantaneous polarity with respect to that of said input voltage determined by the sense of the amplitude excursions of said input voltage with respect to said interconnecting portion.

3. Signal-translating apparatus comprising: a junction-type transistor having a base, an emitter and a collector and having a signal-transfer characteristic dependent upon applied operating potentials and load impedance associated with said transistor; an unbypassed emitter load impedance coupled to said emitter; a collector load impedance coupled to said collector; means coupled in series with said emitter and collector loads for applying unidirectional operating potentials to said transistor, said apparatus having an input voltage-output voltage transfer characteristic from said base to said collector, relative to a plane of reference potential, having two portions of opposite slope and a common interconnecting portion; and means including a voltage source for applying between said base and said plane of reference potential an input signal having a reference amplitude level established at an operating point on said characteristic such that the envelope of said input signal embraces at least a part of each of said opposite slope portions of said transfer characteristic to produce across said collector load an output signal having an instantaneous variation polarity with respect to that of said input signal determined by the sense of amplitude excursions of said input signal relative to said common interconnecting portion.

4. Signal-translating apparatus comprising: a function-type transistor having an emitter, a base and a collector; an emitter load representing a predetermined emitter load impedance; a collector load coupled to said collector and representing a predetermined collector load impedance; a source of unidirectional supply potential coupled in series with said emitter and said collector loads, said apparatus having an input voltage-output voltage transfer characteristic from said base to said collector, relative to a plane of reference potential, extending over a predetermined signal input range and having two portions of opposite polarity slope joining at a common vertex located within said range at a point determined by the ratio of the impedance of said emitter load and the impedance of said collector load; and means including a voltage source for applying between said base and said plane of reference potential a varying input voltage having an amplitude characteristic established at a particular operating point on said transfer characteristic with respect to said vertex such that the envelope of said input voltage embraces at least a part of each of said opposite polarity slope portions of said transfer characteristic to produce between said collector and said plane of reference potential an output voltage having an instantaneous variation polarity with respect to that of said input voltage determined by the sense of the amplitude excursions of said input voltage with respect to said vertex.

5. Signal-translating apparatus comprising: a junction-type transistor having an emitter, a base and a collector; a two-terminal emitter resistive load one terminal of which is connected to said emitter; a collector resistive load coupled to said collector; a source of unidirectional supply potential defining a predetermined potential range coupled in series with said emitter and said collector loads, said apparatus having an input voltage-output voltage transfer characteristic, from said base to said collector with the other terminal of said emitter load as a reference, covering said predetermined potential range and having two portions of opposite polarity slope joining at a common vertex located within said potential range at a point determined by the ratio of the resistance of said emitter load and the resistance of said collector load; and means including a voltage source for applying between said base and said other terminal of said emitter load a varying input voltage having an amplitude characteristic established at a particular operating point on said transfer characteristic with respect to said vertex such that the envelope of said input voltage embraces at least a part of each of said opposite polarity slope portions of said transfer characteristic to produce between said collector and said other terminal of said emitter load an output voltage having an instantaneous variation polarity with respect to that of said input voltage determined by the sense of the amplitude excursions of said input voltage with respect to said vertex.

6. Signal-translating apparatus comprising: a junction-type transistor having an emitter, a base and a collector; an emitter load impedance coupled to said emitter; a collector load impedance coupled to said collector; a source of unidirectional supply potential coupled in series with said emitter and said collector loads, said apparatus having an input voltage-output voltage transfer characteristic, from said base to said collector with the other terminal of said emitter load as a reference, having two portions of opposite polarity slope joining at a common vertex, one portion having a slope of substantially unity and the other portion having a slope determined by the ratio of the impedance of said emitter load and the impedance of said collector load; and means including a voltage source for applying between said base and said other terminal of said emitter load a varying input voltage having an amplitude characteristic established at a particular operating point on said transfer characteristic with respect to said vertex such that the envelope of said input voltage embraces at least a part of each of said opposite polarity slope portions of said transfer characteristic to produce between said collector and said other terminal of said emitter load an output voltage having an instantaneous variation polarity with respect to that of said input voltage determined by the sense of the amplitude excursions of said input voltage with respect to said vertex.

7. Signal-translating apparatus comprising: a junction-type transistor having an emitter, a base and a collector; an emitter load coupled to said emitter; a collector load coupled to said collector; a source of unidirectional supply potential coupled in series with said emitter and said collector loads, said apparatus having a first input voltage-output voltage transfer characteristic from said base to said collector, relative to a plane of reference potential, having two portions of opposite polarity slope joining at a common vertex and also to provide a second input voltage-output voltage transfer characteristic from said base to said emitter, relative to said plane of reference potential, constituting an extension of one of said two portions beyond said vertex; and means including a voltage source for applying between said base and said plane of reference potential a varying input voltage having an amplitude characteristic established at a particular operating point on said first transfer characteristic with respect to said vertex such that the envelope of said input voltage embraces at least a part of each of said opposite polarity slope portions of said first transfer characteristic to produce between said collector and said plane of reference potential an output voltage having an instantaneous variation polarity with respect to that of said input voltage determined by the sense of the amplitude excursions of said input voltage with respect to said vertex.

8. Signal-translating apparatus comprising: a junction-type transistor having an emitter, a base and a collector; an emitter load coupled to said emitter; a collector load coupled to said collector; a source of unidirectional supply potential coupled in series with said emitter and said collector loads, said apparatus having an input voltage-output voltage transfer characteristic from said base to said collector, relative to a plane of reference potential, having one portion of a slope of one polarity representing the rate at which collector current increases and another portion of opposite polarity slope representing the rate at which collector current decreases, said portions joining at a common vertex indicating the point at which collector current reaches a maximum; and means including a voltage source for applying between said base and said plane of reference potential a varying input voltage having an amplitude characteristic established at a particular operating point on said transfer characteristic with respect to said vertex such that the envelope of said input voltage embraces at least a part of each of said opposite polarity slope portions of said transfer characteristic to produce between said collector and said plane of reference potential an output voltage having an instantaneous variation polarity with respect to that of said input voltage determined by the sense of the amplitude excursions of said input voltage with respect to said vertex.

9. Signal-translating apparatus comprising: a junction-type transistor having an emitter, a base and a collector; an emitter load coupled to said emitter; a collector load coupled to said collector; a source of unidirectional supply potential coupled in series with said emitter and said collector loads, said apparatus having an input voltage-output voltage transfer characteristic from said base to said collector, relative to a plane of reference potential, having two portions of opposite polarity slope joining at a common vertex; and means including a voltage source for applying between said base and said plane of reference potential a varying input voltage having its zero axis established at said vertex such that the envelope of said input voltage embraces at least a part of each of said opposite polarity slope portions of said transfer characteristic to produce between said collector and said plane of reference potential an output voltage having an instantaneous variation polarity with respect to that of said input voltage determined by the sense of the amplitude excursions of said input voltage with respect to said vertex.

10. Signal-translating apparatus comprising: a transistor having an emitter, a base and a collector; an emitter load coupled to said emitter; a collector load coupled to said collector; a source of unidirectional supply potential coupled in series with said emitter and said collector loads, said apparatus having an input voltage-output voltage transfer characteristic from said base to said collector, relative to said plane of reference potential, having two portions of opposite polarity slope joining at a common vertex; and means for applying between said base and said plane of reference potential a varying intelligence signal voltage such that during certain intervals said intelligence signal voltage falls completely within one of said portions of said transfer characteristic and during other intervals said intelligence signal voltage lies completely within the other one of said portions of said transfer characteristic to produce between said collector and said plane of reference potential output voltage variations that are in phase with respect to variations of said intelligence signal voltage during said certain intervals but are in phase opposition with respect to variations of said intelligence signal voltage during said other intervals.

11. Signal-translating apparatus comprising: a transistor having an emitter, a base and a collector; an emitter load coupled to said emitter; a collector load coupled to said collector; a source of unidirectional supply potential coupled in series with said emitter and said collector loads, said apparatus having an input voltage-output voltage transfer characteristic from said base to said collector, relative to said plane of reference potential, having two portions of opposite polarity slope joining at a common vertex; means for developing a varying intelligence signal voltage; and means for superimposing a rectangularly shaped control signal voltage onto said intelligence signal voltage and for applying the combination control-intelligence signal voltage thereby developed between said base and said plane of reference potential such that during certain intervals said intelligence signal voltage falls completely within one of said portions of said transfer characteristic and during other intervals said intelligence signal voltage falls completely within the other one of said portions of said transfer characteristic to produce between said collector and said plane of reference potential output voltage variations that are in phase with respect to variations of said intelligence signal voltage during said certain intervals but are in phase-opposition with respect to variation of said intelligence signal voltage during said other intervals.

12. An encoding arrangement for a secrecy communication system comprising: a transistor having an emitter, a base and a collector; a two-terminal emitter load one terminal of which is connected to said emitter; a collector load coupled to said collector; a source of unidirectional supply potential coupled in series with said emitter and said collector loads, said apparatus having an input voltage-output voltage transfer characteristic, from said base to said collector with the other terminal of said emitter load as a reference, having two portions of opposite polarity slope joining at a common vertex; means for developing an audio signal voltage; means for developing a rectangularly shaped encoding signal having its amplitude varying between two discrete potential levels in accordance with a predetermined code schedule, the periods during which said encoding signal is established at one level defining one series of intervals and the periods during which said encoding signal is established at the other level representing a second series of intervals; and means for effectively adding said audio and encoding signals and for applying the combined audio-encoding signal between said base and said other terminal of said emitter load such that the intervals of said audio signal voltage occurring during said one series of intervals fall completely within one of said portions of said transfer characteristic and the intervals of said audio signal voltage occurring during said other series of intervals fall completely within the other one of said portions of said transfer characteristic to produce between said collector and said other terminal of said emitter load an output voltage that is in phase with respect to said audio signal voltage during said one series of intervals but is in phase opposition with respect to said audio signal voltage during said other series of intervals to achieve encoding.

13. Signal-translating apparatus comprising: a transistor having an emitter, a base and a collector; an emitter load coupled to said emitter; a collector load coupled to said collector; a source of unidirectional supply potential coupled in series with said emitter and said collector loads, said apparatus having an input voltage-output voltage transfer characteristic of triangular shape from said base to said collector, relative to a plane of reference potential, having one portion of relatively gradual slope in one direction and another portion of relatively steep slope in another direction extending to a vertex intersection with said one portion; and means for applying between said base and said plane of reference potential an input signal including desired intelligence signal components but subject to be accompanied by undesired signal components having an amplitude characteristic established at a particular point on said transfer characteristic with respect to said vertex such that said desired signal components fall at least partially in said one portion of said transfer characteristic having said gradual slope and said undesired signal components fall at least partially in said other one of said portions of said transfer characteristic having said steep slope to produce between said collector and said plane of reference potential an output voltage that is a substantial replica of said desired components but is substantially devoid of said undesired distortion signal components.

14. Signal-translating apparatus comprising: a transistor having an emitter, a base and a collector; an emitter load coupled to said emitter; a collector load coupled to said collector; a source of unidirectional supply potential coupled in series with said emitter and said collector load, said apparatus having an input voltage-output voltage transfer characteristic from said base to said collector, relative to a plane of reference potential, having one portion of relatively gradual slope in one direction and another portion of relatively steep slope in another direction extending from a vertex intersection with said one portion to a portion of substantially zero slope; a source of composite video signal including video components of varying amplitude within a range below a predetermined blanking pedestal level and synchronizing-signal components of an amplitude exceeding said blanking pedestal level, said composite video signal being subject to extraneous noise impulses of greater amplitude than said synchronizing-signal components; and means for applying said composite video signal between said base and said plane of reference potential such that said video and synchronizing-signal components fall at least partially in said one portion of said transfer characteristic having said gradual slope and said extraneous noise impulses extend at least partially to said other portion of said transfer characteristic having said steep slope and also to the portion of zero slope to produce between said collector and said plane of reference potential an output voltage substantially corresponding to said video and synchronizing-signal components and substantially excluding said extraneous noise impulses.

15. Signal-translating apparatus comprising: a transistor having an emitter, a base and a collector; an emitter load coupled to said emitter; a collector load coupled to said collector; a source of unidirectional supply potential coupled in series with said emitter and said collector loads, said apparatus having an input voltage-output voltage transfer characteristic from said base to said collector, relative to a plane of reference potential, having, in the order named, a first portion of relatively gradual slope and of one polarity representing an operating mode in which applied voltages are translated in like phase, a second portion of relatively steep slope but of opposite polarity representing an operating mode in which applied voltages are translated in phase opposition, and a third portion of substantially zero slope representing an operating mode in which applied voltages are clamped to a predetermined clamping potential level; and means for applying between said base and said plane of reference potential a varying input voltage, including desired intelligence signal components and undesired distortion signal components, having an amplitude characteristic established at a particular operating point on said transfer characteristic such that said desired signal components fall in said first portion of said transfer characteristic and said undesired signal components fall in both said second and third portions of said transfer characteristic to produce between said collector and said plane of reference potential an output voltage that is a simulation of, and in phase with, said desired components with said undesired components being phase inverted and clamped to said predetermined clamping level.

16. Signal-translating apparatus comprising: a transistor having an emitter, a base and a collector; an emitter circuit including a load impedance and a potential source series connected to said emitter to establish a forward bias therefor; a collector circuit including a load impedance and a potential source series connected to said collector to establish a forward bias therefor; means coupling said emitter and collector loads in series, said apparatus having an input voltage-output voltage transfer characteristic from said base to said collector, relative to a plane of reference potential, having two portions of opposite polarity slope joined at a common vertex representing a condition at which said emitter and collector are at the same operating potential; and means for applying between said base and said plane of reference potential an input signal having a reference amplitude level established at an operating point on said characteristic such that the envelope of said input signal embraces at least a part of each of said opposite polarity slope portions of said transfer characteristic whereby the phase of an output signal developed across said collector load is determined by the sense of amplitude excursions of said input signal relative to said vertex.

17. Signal-translating apparatus comprising: a transistor having an emitter, a base and a collector; an emitter circuit including a load impedance and a potential source series connected to said emitter to establish a forward bias therefor; a collector circuit including a load impedance and a potential source series connected to said collector to establish a forward bias therefor; means coupling said emitter and collector loads in series, said apparatus having, in response to increasing levels of an input signal applied to said base with a polarity tending to bias said transistor to cut off, an input voltage-output voltage transfer characteristic from said base to said collector, relative to a plane of reference potential, having one portion of one slope, a vertex representing equal potentials at said emitter and collector, and another portion of opposite slope extending from said vertex to a final portion of zero slope representing cut off in said transistor; and means for applying between said base and said plane of reference potential an input signal having a reference amplitude level established at an operating point on said characteristic such that different intervals of said input signal fall in different ones of said portions of said transfer characteristic.

18. Signal-translating apparatus comprising: a transistor having an emitter, a base and a collector and responsive to a predetermined biasing condition to exhibit a certain storage time of a predetermined duration; a two-terminal emitter load one terminal of which is connected to said emitter; a collector load coupled to said collector; a two-terminal unidirectional device, also responsive to a predetermined biasing condition to exhibit a storage time equal to that of said transistor, shunting at least a portion of said collector load and arranged polarity-wise such that said device normally conducts current only when the base-collector junction of said transistor is forward biased; means, including a source of unidirectional supply potential coupled in series with said emitter and said collector loads, for forward biasing the base-collector and base-emitter junctions of said transistor to provide at one terminal of said unidirectional device an output voltage clamped to a predetermined potential level, said transistor and said unidirectional device being thereby biased to exhibit said certain storage time; and means for applying between said base and said other terminal of said emitter load an input voltage for instantaneously reverse biasing the base-collector and base-emitter junctions of said transistor, the base-collector junction translating current in a reverse direction through said collector load for an interval equal to said storage time, tending to vary the output voltage at said one terminal of said unidirectional device, but said unidirectional device translating such current for the same interval to substantially prevent any change in the output voltage from said predetermined clamping potential level.

19. Signal-translating apparatus comprising: a transistor having an emitter, a base and a collector; an emitter circuit including a load impedance and a potential source series connected to said emitter to establish a forward bias therefor; a collector circuit including a pair of load impedances and a potential source series connected to said collector to establish a forward bias therefor and a unidirectional device shunting one of said collector load impedances and poled to be conductive in response to said forward collector bias; means coupling said emitter and collector load impedances in series, said apparatus having, in response to increasing levels of an input signal applied to said base with a polarity tending to bias said transistor to cut off, an input voltage-output voltage transfer characteristic from said base to the shunted one of said collector load impedances, relative to a plane of reference potential, having a first portion of substantially zero slope representing clamping action of said unidirectional device, another portion sloping in one sense, a vertex representing equal potentials at said emitter and collector electrodes, another portion sloping in the opposite sense, and a final substantially zero slope portion representing cut off in said transistor; and means for applying between said base and said plane of reference potential an input signal having a reference amplitude level established at an operating point on said characteristic such that different intervals of said input signal lie in different ones of said portions of said transfer characteristic.

20. Signal-translating apparatus comprising: a transistor having an emitter, a base and a collector; an emitter circuit including a load impedance and a potential source series connected to said emitter electrode to establish a forward bias therefor; a collector circuit including a pair of load impedances and a potential source series-connected to said collector to establish a forward bias therefor and a semiconductor diode shunting one of said collector load impedances and poled to be conductive in response to said forward collector bias, the base-collector junction of said transistor and said diode exhibiting substantially the same charge storage time in response to said potential sources; means coupling said emitter and collector load impedances in series, said apparatus having in response to increasing levels of an input signal applied to said base with a polarity tending to bias said transistor to cut off an input voltage-output voltage transfer characteristic from said base to the shunted one of said collector load impedances, relative to a plane of reference potential, having a first portion of substantially zero slope representing clamping action of said semi-conductor diode, another portion sloping on one sense, a vertex representing equal potentials at said emitter and collector electrodes, another portion sloping in opposite sense, and a final substantially zero slope portion representing cut off in said transistor; and means for applying between said base and said plane of reference potential an input signal having a reference amplitude level established at an operating point on said characteristic such that different intervals of said input signal lie in different ones of said portions of said transfer characteristic.

21. Signal-translating apparatus comprising: a transistor having a base, an emitter and a collector; an output load impedance coupled in series with said collector; potential supply means coupled in series with said emitter and collector; an input circuit coupled to said base; and means for applying an input signal to said input circuit and for establishing, in conjunction with said potential supply means, an input voltage-output voltage transfer characteristic from said input circuit to said collector, relative to a plane of reference potential, such that as said input signal increases in one sense the potential across said load impedance rises sharply from a minimum to a maximum value, maintains such maximum value for a certain range of input levels and decreases sharply to said minimum in response to input signal levels exceeding said range.

22. Signal-translating apparatus comprising: a transistor having an emitter, a base and a collector; a load impedance and a potential source connected in series with said collector; a potential source coupled to said emitter exceeding said collector potential source in magnitude; an input circuit coupled to said base which is effectively an open circuit in the absence of applied signals; and means for applying an input signal to said input circuit and for establishing, in conjunction with said potential sources, an input voltage-output voltage transfer characteristic from said input circuit to said collector, relative to a plane of reference potential, such that as said input signal increases with a polarity tending to effect forward biasing of the base-emitter junction of said transistor the collector potential rises sharply from a minimum value corresponding to said collector source to a maximum value corresponding to said emitter source as said transistor attains saturation, remains substantially flat until the base potential biases said transistor to substantial cut off, and then sharply decreases back to said minimum value.

23. Signal-translating apparatus comprising: a first transistor having an emitter, a base and a collector; a second transistor having an emitter, a base and a collector; a first series-connected current-translating circuit including the emitter-collector conduction path of said first transistor, the base-emitter junction of said second transistor, a first source of unidirectional supply potential and an emitter load, said first source being connected to a plane of reference potential; a second series-connected current-translating circuit including the emitter-collector conduction path of said second transistor, a collector load and a second source of unidirectional supply potential, said second source connected to said plane of reference potential, to provide an overall input voltage-output voltage transfer characteristic, from the base of said first transistor to the collector of said second transistor with respect to said reference plane, having two portions of opposite polarity, relatively steep finite slope of substantially equal length preceded, separated and followed by portions of substantially zero slope; and means for applying between the base of said first transistor and said plane of reference potential a varying input voltage, having desired signal components of relatively constant peak amplitude and undesired signal components lying above and below said peak amplitude, such that said desired signal components fall in the zero slope portion separating the portions of opposite polarity slope on said transfer characteristic and said undesired signal components fall in the zero slope portions preceding and following the portions of opposite polarity slope to produce between the collector electrode of said second transistor and said plane of reference potential an output voltage containing only said desired signal components freed of substantially all of said undesired components.

24. Signal-translating apparatus comprising: a first NPN type transistor having an emitter, a base and a collector; a second PNP type transistor having an emitter, a base and a collector; a first series-connected current-translating circuit including the emitter-collector conduction path of said first transistor, the base-emitter junction of said second transistor, a first source of unidirectional potential of a predetermined positive magnitude, and an emitter load, said first source being connected to a plane of ground reference potential; a second series-connected current-translating circuit including the emitter-collector conduction path of said second transistor, a collector load and a second source of unidirectional positive potential with respect to ground but negative with respect to the potential of said first source, said second source also being connected to said plane of ground reference potential, to provide an overall input voltage-output voltage transfer characteristic, from the base of said first transistor to the collector of said second transistor with respect to ground as a reference, having, in the order named, a first portion of substantially zero slope representing a range of input voltages negative with respect to ground, a second portion of one polarity, relatively steep finite slope representing a relatively small range of input voltages positive with respect to ground, a third portion of substantially zero slope representing a relatively wide range of input voltages positive with respect to ground but negative with respect to the potential on the emitter of said second transistor, a fourth portion of relatively step, opposite polarity finite slope representing a relatively small range of applied voltages slightly negative with respect to that on the emitter of said second transistor, and a fifth portion of substantially zero slope representing a range of applied voltages positive with respect to that on the emitter of said second transistor; and means for applying between the base of said first transistor and ground a varying input voltage including desired signal components of a relatively constant peak amplitude and undesired signal components lying above and below said peak amplitude such that said desired components fall in said third portion and said undesired components fall in said first and fifth portions to produce between the collector of said second transistor and ground an output voltage containing only said desired signal components freed of substantially all of said undesired components.

25. Signal-translating apparatus comprising: a first transistor having an emitter, a base and a collector; a second transistor having an emitter, a base and a collector electrode; a first series-connected current-translating circuit including the emitter-collector conduction path of said first transistor, the base-emitter junction of said second transistor, a first source of unidirectional supply potential and an emitter load, said first source being connected to a plane of reference potential; a second series-connected current-translating circuit including the emitter-collector conduction path of said second transistor, a collector load and a second source of unidirectional supply potential, said second source connected to said plane of reference potential, to provide an overall input voltage-output voltage transfer characteristic, from the base of said first transistor to the collector of said second transistor with respect to said reference plane, having two portions of opposite polarity, relatively steep finite slope of substantially equal length preceded, separated and followed by portions of substantially zero slope; means for developing a composite video signal including video components varying within a range below a predetermined blanking pedestal level, synchronizing components lying in a range exceeding said blanking pedestal level and having a predetermined peak amplitude and undesired noise components of greater amplitude than said peak amplitude of said synchronizing components; and means for applying said compopsite video signal between the base of said first transistor and said plane of reference potential with said peak amplitude lying in the zero slope portion separating the portions of opposite polarity slope on said transfer characteristic such that said video and noise components fall in the zero slope portions preceding and following the portions of opposite polarity slope to produce between the collector of said second transistor and said plane of reference potential an output voltage containing only said synchronizing components substantially stripped of both said video and noise components.

26. Signal-translating apparatus comprising: one transistor including a base, an emitter and a collector; an output load impedance coupled in series with said collector; potential supply means coupled in series with said emitter and said load impedance; a normally-open input circuit coupled to said base, and including another transistor, for rendering said one transistor normally cut off; a semi-conductor diode shunting the base-emitter junction of said one transistor and exhibiting substantially the same charge storage time as said other transistor; and means for applying an input pulse to said input circuit to render both said transistors conductive to produce an output signal across said load impedance, the charge storage property of said other transistor tending to maintain said one transistor forward biased during an interval equal to said storage time subsequent to the termination of the applied input pulse but said semi-conductor diode conducting during such intervals to prevent any continued forward biasing to insure instantaneous cut off of said one transistor subsequent to the termination of the applied input pulse.

27. Signal-translating apparatus comprising: a first transistor having an emitter, a base and a collector and responsive to a predetermined biasing condition to exhibit a charge storage time of a predetermined duration; a second transistor having an emitter, a base and a collector; a first series-connected current-translating circuit including the emitter-collector conduction path of said first transistor, the base-emitter junction of said second transistor, a first source of unidirectional potential, and an emitter load, said first source being connected to a plane of reference potential; a second series-connected current-translating circuit including the emitter-collector conduction path of said second transistor, a collector load, and a second source of unidirectional supply potential, said second source being connected to said plane of reference potential, to provide an overall input voltage-output voltage transfer characteristic from the base of said first transistor to the collector of said second transistor, with respect to said plane of reference potential, having two portions of opposite polarity, relatively steep slope preceded, separated and followed by first, second and third portions, respectively of substantially zero slope; means for applying between the base of said first transistor and said plane of reference potential an input pulse tending to instantaneously change the operating mode from that represented by said first portion of substantially zero slope to that represented by said third portion of substantially zero slope and then instantaneously back to said first portion, said first transistor continuing to conduct tending to maintain said second transistor also conductive subsequent to the termination of said imput pulse due to the charge storage property of said first transistor thereby tending to produce an undesirable pulse across the collector load included in said second series-connected circuit; and a semi-conductor diode shunting the base-emitter junction of said second transistor and responsive to a predetermined biasing condition to exhibit substantially the same charge storage time as the first transistor for shunting the current around said second transistor subsequent to the termination of said input pulse during the charge storage time of said first transistor to prevent continued conduction of said second transistor thereby to prevent the development of an undesired pulse in the collector load of said second current-translating circuit subsequent to the termination of said input pulse.

28. Signal-translating apparatus comprising: a transistor having a base, an emitter and a collector; an output load impedance coupled in series with said collector; an emitter load impedance coupled in series with said emitter; potential supply means coupled in series with said load impedances; an input circuit coupled to said base; and means for applying an input signal to said input circuit for establishing, in conjunction with said potential supply means, an input voltage-output voltage transfer characteristic from said input circuit to said collector, relative to a plane of reference potential, having a first portion of substantially zero slope, a second portion of relatively steep slope and of one polarity, a third portion of relatively gradual slope and of the other polarity, a fourth portion of relatively gradual slope and of said one polarity, a fifth portion of relatively steep slope and of said other polarity, and a sixth portion of substantially zero slope.

29. Signal-translating apparatus comprising: a first transistor having an emitter, a base and a collector; a second transistor having an emitter, a base and a collector; a first series-connected current-translating circuit including the emitter-collector conduction path of said first transistor, the base-emitter junction of said second transistor, an emitter load for said second transistor, a first source of unidirectional supply potential and an emitter load for said first transistor, said first source being connected to a plane of reference potential; and a second series-connected current-translating circuit including the emitter-collector conduction path of said second transistor, a collector load, the emitter load for said second transistor, and a second source of unidirectional supply potential, said second source being connected to said plane of reference potential, to provide for applied input signals an overall or input voltage-output voltage transfer characteristic from the base of said first transistor to the collector of said second transistor, with respect to said reference plane having, in the order named, a first portion of substantially zero slope representing an operating mode when both said transistors are cut off, a second portion of relatively steep slope and of one polarity representing an operating mode in which both said transistors function as amplifiers, a third portion of relatively gradual slope and of the other polarity representing an operating mode in which said second transistor is short circuited while said first transistor continues to function as an amplifier, a fourth portion of relatively gradual slope and of said one polarity representing an operating mode in which both said transistors are short circuited, a fifth portion of relatively steep slope and of said other polarity representing an operating mode in which said second transistor again functions as an amplifier while said first transistor remains short circuited, and a sixth portion in which said second transistor again becomes cut off while said first transistor remains short circuited.

30. Signal-translating apparatus comprising: a transistor having a base, an emitter, and a collector; an emitter load impedance coupled to said emitter; a collector load impedance coupled to said collector; a potential source coupled in series with said emitter and collector electrodes; an input circuit coupled to said base; and means for applying an input signal to said input circuit for establishing an input voltage-output voltage transfer characteristic between said input circuit and said collector, relative to a plane of reference potential, having a first portion of substantially zero slope, a second portion of relatively steep slope and of one polarity, a third portion of relatively gradual slope and of the other polarity, a fourth portion of relatively steep slope and of said one polarity, and a fifth portion of substantially zero slope.

31. Signal-translating apparatus comprising: a first transistor having a base, an emitter and a collector; circuit means including a potential source coupled between the collector and emitter of said first transistor; a second transistor having a base, an emitter and a collector; circuit means including a potential source coupled between the collector and emitter of said second transistor; means coupling said first transistor to said second transistor; and means for applying an input signal to the base of said first transistor for establishing an input voltage-output voltage transfer characteristic between the base of said first transistor and the collector of said second transistor, relative to a plane of reference potential, having a first portion of relatively zero slope, a second portion of relatively steep slope and of one polarity, a third portion of relatively gradual slope and of the other polarity, a fourth portion of relatively steep slope and of said one polarity, and a fifth portion of substantially zero slope.

32. Signal-translating apparatus comprising: a first transistor having an emitter, a base and a collector; a second transistor having an emitter, a base and a collector; an emitter load impedance coupled to the emitter of said second transistor; a source of unidirectional supply potential coupled between the emitter load impedance of said second transistor and a plane of reference potential; a collector load impedance coupled between the collector of said second transistor and a tap along said potential source; an emitter load impedance coupled between the emitter of said first transistor and said plane of reference potential; a collector load impedance coupled between the collector of said first transistor and said tap of said potential source; means coupling the collector of said first transistor to the base of said second transistor; and means for applying an input signal to the base of said first transistor for establishing an overall input voltage-output voltage transfer characteristic from the base of said first transistor to the collector of said second transistor, with respect to said plane of reference potential, having a first portion of substantially zero slope representing an operating mode in which said first transistor is cut off and said second transistor is short circuited, a second portion of relatively steep slope and of one polarity representing an operating mode in which said first transistor functions as an amplifier while said second transistor is short circuited, a third portion of relatively gradual slope and of said other polarity representing an operating mode in which both said transistors are short circuited, a fourth portion of relatively steep slope and of said one polarity representing an operating mode in which said first transistor remains short circuited while said second transistor serves an as amplifier and a fifth portion of substantially zero slope representing an operating mode in which said second transistor becomes cut off while said first transistor remains short circuited.

References Cited in the file of this patent

UNITED STATES PATENTS

| | | |
|---|---|---|
| 2,629,833 | Trent | Feb. 24, 1953 |
| 2,665,845 | Trent | Jan. 12, 1954 |
| 2,758,206 | Hamilton | Aug. 7, 1956 |
| 2,762,874 | Barco | Sept. 11, 1956 |
| 2,840,726 | Hamilton | June 24, 1958 |
| 2,870,345 | Overbeek | Jan. 20, 1959 |
| 2,879,410 | Loeb | Mar. 24, 1959 |
| 2,916,543 | Druz | Dec. 8, 1959 |

OTHER REFERENCES

42 Proc. IRE, pages 1761–1772, December 1954.

Shea: Transistor Circuit Engineering, J. Wiley & Sons, 1957, pages 299 to 317.